US012744369B2

(12) United States Patent
Yanagida et al.

(10) Patent No.: US 12,744,369 B2
(45) Date of Patent: Sep. 22, 2026

(54) IN-VEHICLE-COMPONENT CIRCUIT UNIT

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Taiji Yanagida, Osaka (JP); Hiroki Shimoda, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 258 days.

(21) Appl. No.: 18/724,097

(22) PCT Filed: Dec. 21, 2022

(86) PCT No.: PCT/JP2022/047016
§ 371 (c)(1),
(2) Date: Jun. 25, 2024

(87) PCT Pub. No.: WO2023/127620
PCT Pub. Date: Jul. 6, 2023

(65) Prior Publication Data

US 2025/0070541 A1 Feb. 27, 2025

(30) Foreign Application Priority Data

Dec. 27, 2021 (JP) ................................ 2021-213149

(51) Int. Cl.

| | |
|---|---|
| ***H02G 5/08*** | (2006.01) |
| ***B60R 16/023*** | (2006.01) |
| ***H02G 3/08*** | (2006.01) |

(52) U.S. Cl.
CPC .......... *H02G 5/08* (2013.01); *B60R 16/0239* (2013.01); *H02G 3/081* (2013.01)

(58) Field of Classification Search
CPC H02G 3/081; H02G 3/16; H02G 5/08; H05K 7/06; B60R 16/02; B60R 16/0239
See application file for complete search history.

(56) References Cited

U.S. PATENT DOCUMENTS

2021/0043909 A1* 2/2021 Oga .................. H01B 13/0036
2022/0181747 A1* 6/2022 Yanagida ........... H01M 50/296
(Continued)

OTHER PUBLICATIONS

International Search Report, Application No. PCT/JP2022/047016, mailed Mar. 7, 2023. ISA/Japan Patent Office.

*Primary Examiner* — Timothy J Thompson
*Assistant Examiner* — Rhadames Alonzo Miller
(74) *Attorney, Agent, or Firm* — Brooks Kushman P.C.

(57) ABSTRACT

An in-vehicle-component circuit unit includes a circuit constituent member, a case, a connection bus bar including an internal connection portion and an external connection portion, a first window portion facing the internal connection portion and a first bolt insertion hole in the case, and a second window portion facing the external connection portion and a second bolt insertion hole in the case, The first bolt insertion hole and the second bolt insertion hole are each sized to include a tolerance absorbing gap, the connection bus bar is accommodated so as to be displaceable relative to the case in a tolerance absorbing direction, the first window portion is open with a size that enables a bolt fastening operation to be performed through the first window portion, and the second window portion is open with a size that enables a bolt fastening operation to be performed through the second window portion.

11 Claims, 14 Drawing Sheets

(56) References Cited

U.S. PATENT DOCUMENTS

2022/0255304 A1* 8/2022 Fujimura ................. H05K 7/06
2022/0394873 A1* 12/2022 Kuzuhara ............ H01R 25/142

* cited by examiner 10
18
76
78
80
72
68
74
58a
88
16
100
64a
102
62a
94
82
79
108
140
116
116
140
70
138
138
114
106
34
12 (14)
42
40
36
56
26 (26b)
26 (26a)
32
38
44
44
52
24
50
50
46
46

IN-VEHICLE-COMPONENT CIRCUIT UNIT

CROSS-REFERENCE TO RELATED APPLICATIONS

This application is the U.S. national stage of PCT/JP2022/047016 filed on Dec. 21, 2022, which claims priority of Japanese Patent Application No. JP 2021-213149 filed on Dec. 27, 2021, the contents of which are incorporated herein.

TECHNICAL FIELD

The present disclosure relates to an in-vehicle-component circuit unit.

BACKGROUND

JP 2012-243449A discloses a structure including a circuit unit, such as a junction box, housed in a casing of a battery pack, which is an in-vehicle component configured to be mounted in a vehicle, together with a battery module and a battery control system. In the structure employed here, in order to enable the circuit unit housed in the casing of the battery pack to be connected to an external device, a connector to which an external counterpart connector is to be connected is provided on a peripheral wall of the casing, and the connector and the circuit unit are conductively connected to each other using relay components such as a coated wire and a bus bar.

The structure of JP 2012-243449A requires relay components such as a coated wire and a bus bar to provide a connection between the connector provided on the casing and an external connection portion provided in the circuit unit housed in the casing, and therefore inherently faces the problems of a large component count and poor handleability. In addition, when the circuit unit is a junction box or the like housed in the casing of a high voltage component such as a battery pack, as in the case of JP 2012-243449A, the relay components and the external connection portion of the circuit unit become current-carrying portions. Accordingly, there is also a need to separately provide protection against electric shock hazards. This results in a complex structure for connecting the external connection portion of the in-vehicle-component circuit unit to the connector provided in the casing of the in-vehicle component, thus inevitably reducing the workability.

Therefore, there is disclosed an in-vehicle-component circuit unit that can achieve a simplified connection structure between an external connection portion of the in-vehicle-component circuit unit and a connector provided in a casing of an in-vehicle component, as well as improved connection workability.

SUMMARY

An in-vehicle-component circuit unit according to the present disclosure is an in-vehicle-component circuit unit configured to be housed in a casing of an in-vehicle component, including: a circuit constituent member; an insulating case accommodating the circuit constituent member; a connection bus bar accommodated in the case and including an internal connection portion configured to be conductively connected to a circuit-side connection portion provided in the circuit constituent member, and an external connection portion configured to be conductively connected to a connector-side connection portion of a connector provided on the casing; a first window portion provided in the case and disposed facing the internal connection portion of the connection bus bar and a first bolt insertion hole provided in the internal connection portion; and a second window portion provided in the case and disposed facing the external connection portion of the connection bus bar and a second bolt insertion hole provided in the external connection portion, wherein the first bolt insertion hole and the second bolt insertion hole are each sized to include a tolerance absorbing gap extending in a tolerance absorbing direction, the connection bus bar is accommodated so as to be displaceable relative to the case in the tolerance absorbing direction, the first window portion is open with a size that enables a bolt fastening operation to be performed from an exterior of the case to the circuit-side connection portion of the internal connection portion through the first window portion, and the second window portion is open with a size that enables a bolt fastening operation to be performed from the exterior of the case to the connector-side connection portion of the external connection portion through the second window portion.

Advantageous Effects

According to the present disclosure, it is possible to provide an in-vehicle-component circuit unit that can achieve a simplified connection structure between an external connection portion of the in-vehicle-component circuit unit and a connector provided in a casing of an in-vehicle component, as well as improved connection workability.

DETAILED DESCRIPTION OF PREFERRED EMBODIMENTS

Figure 1:
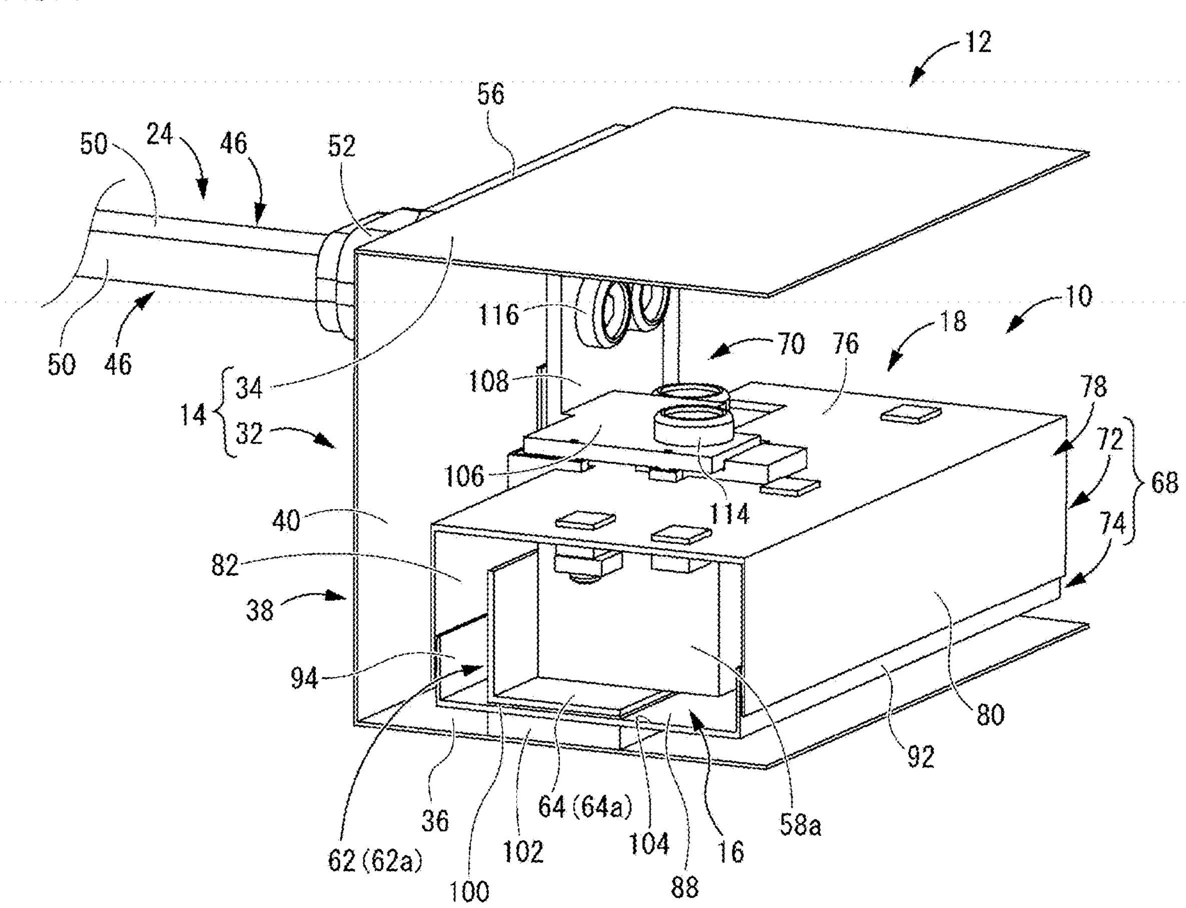
FIG. 1 is a perspective view showing a state in which an in-vehicle-component circuit unit according to Embodiment 1 is housed in a casing of an in-vehicle component and fastened thereto using bolts.

First, aspects of the present disclosure will be listed and described.

An in-vehicle-component circuit unit according to the present disclosure is an in-vehicle-component circuit unit configured to be housed in a casing of an in-vehicle component, including: a circuit constituent member; an insulating case accommodating the circuit constituent member; a connection bus bar accommodated in the case and including an internal connection portion to be conductively connected to a circuit-side connection portion provided in the circuit constituent member, and an external connection portion to be conductively connected to a connector-side connection portion of a connector provided on the casing; a first window portion provided in the case and disposed facing the internal connection portion of the connection bus bar and a first bolt insertion hole provided in the internal connection portion; and a second window portion provided in the case and disposed facing the external connection portion of the connection bus bar and a second bolt insertion hole provided in the external connection portion, wherein the first bolt insertion hole and the second bolt insertion hole are each sized to include a tolerance absorbing gap extending in a tolerance absorbing direction, the connection bus bar is accommodated so as to be displaceable relative to the case in the tolerance absorbing direction, the first window portion is open with a size that enables a bolt fastening operation to be performed from an exterior of the case to the circuit-side connection portion of the internal connection portion through the first window portion, and the second window portion is open with a size that enables a bolt fastening operation to be performed from the exterior of the case to the connector-side connection portion of the external connection portion through the second window portion.

With the in-vehicle-component circuit unit according to the present aspect, the connection bus bar that conductively connects the circuit-side connection portion and the connector-side connection portion to each other is accommodated in the case so as to be displaceable in the tolerance absorbing direction. Furthermore, the internal connection portion and the external connection portion of the connection bus bar accommodated in the case can be bolt-fastened from the exterior to the circuit-side connection portion and the connector-side connection portion, respectively, via the first window portion and the second window portion provided in the case. Therefore, in a state in which the circuit unit is disposed in the casing of the in-vehicle component, and the connection bus bar is displaced in the tolerance absorbing direction to absorb a tolerance, the internal connection portion and the external connection portion of the connection bus bar can be aligned with the circuit-side connection portion and the connector-side connection portion, respectively, and bolt-fastened thereto from the exterior. This eliminates the need for relay components, such as a coated wire and a bus bar, that have been conventionally required to connect a connector provided on a casing to an external connection portion provided in a circuit unit housed in the casing, so that it is possible to achieve a simplified connection structure between an in-vehicle-component circuit unit and a connector provided in a casing of an in-vehicle component. Moreover, since the connection bus bar is accommodated in the case, it is also possible to advantageously provide protection against electric shocks using the case. Furthermore, the first window portion and the second window portion provided in the case need only be open with a size that enables a bolt fastening operation of the connection portions to be performed from the exterior. Accordingly, portions that may become current-carrying portions can be covered by the case to the greatest extent possible, thus also achieving improved connection workability.

Note that the tolerance absorbing direction may be set as required, and one direction or a plurality of directions may be set. The first/second window portion need only be open with a size that enables a bolt fastening operation of the connection portions to be performed from the exterior of the case. The size may be a size that allows passage of a bolt or a nut when the bolt or the nut is not contained in the case, or may be a size that prevents a bolt or a nut from being detached from the window portions and allows passage of a fastening tool when the bolt or the nut is contained in the case.

It is preferable that each of the first window portion and the second window portion is surrounded by a tubular portion protruding outward of the case. Since the first window portion and the second window portion are surrounded by the tubular portions protruding outward of the case, adjusting the protruding heights of the tubular portions can advantageously prevent a worker from coming into contact with the internal connection portion and the external connection portion, which may become current-carrying portions.

It is preferable that a bolt or a nut is accommodated in an interior of the tubular portion of each of the first window portion and the second window portion, a retaining projection protruding radially inward is provided on a protruding distal end side of the tubular portion, and the bolt or the nut is prevented from being detached from the tubular portion by abutting against the retaining projection. Using the internal spaces of the tubular portions of the first window portion and the second window portion, a bolt or a nut for bolt fastening the internal connection portion and the external connection portion of the connection bus bar to the circuit-side connection portion and the connector-side connection portion can be contained in the case in advance, so that it is possible to further improve the workability. Since the bolt or the nut is accommodated in each of the tubular portions of the first window portion and the second window portion, the sizes of the openings of the first window portion and the second window portion can be reduced to a size that does not allow passage of the bolt or the nut but allows passage of a fastening tool, so that it is possible to further enhance the protection against electric shocks. In particular, it is possible to further enhance the protection against electric shocks by insulating portions of the contained bolt or nut that are exposed from the window portions.

It is preferable that the bolt or the nut accommodated in each of the tubular portions includes an insulated portion, and the insulated portion of the bolt or the nut is configured to: protrude to an exterior from the tubular portion in a non-fastened state; and be accommodated in the tubular portion in a fastened state. Since the bolt or the nut accommodated in each of the tubular portions have an insulated portion, it is possible to prevent an electric shock through a fastening tool during a fastening operation. In particular, when the insulated portion protrudes to the exterior from the tubular portion in a non-fastened state of the bolt or the nut, the non-fastened state can be easily confirmed visually, and the fastening operation can also be performed easily. Moreover, since the protruding portion is the insulated portion, it is also possible to maintain the protection against electric shocks. Furthermore, since the insulated portion is accommodated in the tubular portion in a fastened state, the fastened state can be easily confirmed from the exterior. Furthermore, the height of protrusion of the tubular portion to the exterior of the case can also be minimized for a finished product for which fastening has been completed, so that it is also possible to reduce the size of the in-vehicle-component circuit unit.

It is preferable that the case includes a case body including a placement portion on which the connection bus bar is placed, and a cover part covering the placement portion and attached to the case body so as to be displaceable relative to the case body in the tolerance absorbing direction, and the cover part includes the first window portion and the second window portion, and is displaced together with the connection bus bar in the tolerance absorbing direction. The case is divided into the case body including the placement portion on which the connection bus bar is placed, and the cover part covering the placement portion and attached to the case body so as to be displaceable relative to the case body in the tolerance absorbing direction, and the cover part is displaced together with the connection bus bar. Accordingly, a structure that accommodates the connection bus bar so as to be displaceable relative to the case in the tolerance absorbing direction can be provided in a simple and reliable manner. Moreover, since the cover part, which constitutes a part of the case, is displaced together with the connection bus bar, the sizes of the openings of the first window portion and the second window portion can be smaller than when only the connection bus bar is displaced relative to the case. Accordingly, it is possible to provide safer protection against electric shocks.

It is preferable that the case body includes a fitting hole extending in the tolerance absorbing direction in an area surrounding the placement portion, and the cover part includes a fitting projection protruding from a peripheral edge portion of the cover part toward the case body so as to be fitted to the fitting hole, and the fitting projection has a smaller width dimension in the tolerance absorbing direction than the fitting hole. Since the width dimension, in the tolerance absorbing direction, of the fitting projection of the cover part to be fitted to the fitting hole provided in the case body is smaller than the width dimension of the fitting hole in the tolerance absorbing direction, the fitting projection is displaceable in the fitting hole in the tolerance absorbing direction. As a result, the cover part including the fitting projection is displaceable relative to the case body in the tolerance absorbing direction, so that the fitting projection and the fitting hole for attaching the cover part to the case body can be used to define the end of movement of the cover part (connection bus bar) to the case body in the tolerance absorbing direction.

It is preferable that the fitting projection includes a locking pawl provided at a protruding end portion of the fitting projection and protruding toward the placement portion side relative to the fitting hole, and the locking pawl inserted in the fitting hole is engaged with an edge portion of the fitting hole that is located on the placement portion side. Since the locking pawl protrudes toward the placement portion side relative to the fitting hole and is engaged with an edge portion of the fitting hole that is located on the placement portion side, it is difficult to insert a tool such as a driver into the fitting hole so as to bend the fitting projection in a direction in which the locking pawl and the case body are disengaged from each other, so that the engagement between the locking pawl and the case body is stably maintained. In addition, the engaging portion between the locking pawl and the case body cannot be viewed from the exterior, so that it is possible to more reliably prevent disengagement between the locking pawl and the case body. Consequently, the cover part can be held against the case body in a fixed state. As a result, it is possible to reduce the possibility that a worker may receive an electric shock by accidentally removing the cover part from the case during maintenance.

It is preferable that the internal connection portion and the external connection portion extend in directions intersecting each other, the first bolt insertion hole provided in the internal connection portion and the second bolt insertion hole provided in the external connection portion pass through in directions intersecting each other, and the tolerance absorbing direction of the first bolt insertion hole in the tolerance absorbing gap and the tolerance absorbing direction of the second bolt insertion hole in the tolerance absorbing gap are orthogonal to each other. Since the internal connection portion and the external connection portion extend in directions intersecting each other, the first bolt insertion hole and the second bolt insertion hole that are provided in the internal connection portion and the external connection portion, respectively, are provided intersecting each other. Therefore, the tolerance absorbing direction in the tolerance absorbing gap of the first bolt insertion hole, and the tolerance absorbing direction in the tolerance absorbing gap of the second bolt insertion hole can be set to directions orthogonal to each other, so that the connection bus bar can be displaced relative to the case in at least two directions that are orthogonal to each other. Accordingly, the circuit constituent member to be conductively connected to the internal connection portion, and the connector to be conductively connected to the external connection portion can be stably connected to each other using the connection bus bar. Here, for example, when the tolerance absorbing directions in the tolerance absorbing gap of the first bolt insertion hole are set to two directions that are orthogonal to each other (e.g., front-rear and left-right directions), and the tolerance absorbing direction in the tolerance absorbing gap of the second bolt insertion hole includes a direction (e.g., up-down direction) orthogonal to the two directions, the connection bus bar can be displaced relative to the case in the up-down, left-right, and front-rear directions, thus allowing the circuit constituent member and the connector to be more reliably connected to each other via the connection bus bar.

It is preferable that the cover part includes a rib protruding toward the placement portion, and the rib abuts against or faces the connection bus bar while the cover part is attached to the case body. The rib provided on the cover part and protruding toward the placement portion side abuts against, or faces with a slight gap, the connection bus bar while the cover part is attached to the case body. Thus, the rib suppresses lifting of the connection bus bar when the connection bus bar is displaced so as to be lifted from the placement portion of the case body. This prevents the connection bus bar from rattling in the case. In particular, for example, when the connection bus bar is connected to a heat generating component such as a relay via the circuit constituent member, the circuit constituent member may include a heat dissipation portion that comes into contact with the heat transfer surface provided on the case body. In such a case, it is possible to prevent lifting of not only the connection bus bar, but also the circuit constituent member including the heat dissipation portion, by providing the rib on the cover part to prevent lifting of the connection bus bar. Accordingly, it is possible to advantageously prevent the heat dissipation portion from being lifted from the heat transfer surface toward the cover part side. Thus, it is also possible to stably maintain heat dissipation from the heat generating component via the connection bus bar.

It is preferable that the connection bus bar includes a first end portion provided with the internal connection portion, and a second end portion provided with the external connection portion and protruding above the first end portion, and the internal connection portion includes the first bolt insertion hole having the tolerance absorbing gap in an extension direction of the first end portion, and the external connection portion includes the second bolt insertion hole having the tolerance absorbing gap in an extension direction of the second end portion. The second end portion provided with the external connection portion protrudes above the first end portion provided with the internal connection portion of the connection bus bar, and the first bolt insertion hole and the second bolt insertion hole have tolerance absorbing gaps in extension directions of the first end portion and the second end portion that are different from each other. This makes it possible to set the tolerance absorbing directions to a plurality of directions, thus further increasing the ease of operation of attaching the in-vehicle-component circuit unit to the in-vehicle component. In particular, since the second end portion protrudes above the first end portion, a space for accommodating a component such as a wire harness can also be provided between these end portions.

It is preferable that the connection bus bar is a stack of a plurality of thin plates. Since the connection bus bar is a stack of a plurality of thin plates, the connection bus bar can be flexibly deformed. This also makes it possible to absorb a tolerance by deforming the connection bus bar, for example, even when the connection bus bar has a short length dimension and thus would have a large deformation stiffness if the bus bar is formed by a single flat plate-shaped bus bar. Accordingly, it is possible to more reliably connect the circuit-side connection portion provided in the circuit constituent member and the connector-side connection portion provided in the connector to each other.

Details of Embodiments of the Present Disclosure

Specific examples of an in-vehicle-component circuit unit according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

The following describes Embodiment 1 of the present disclosure with reference to FIGS. 1 to 16. An in-vehicle-component circuit unit 10 is mounted, for example, in a vehicle (not shown) such as an electric automobile and a hybrid automobile, and enables supply and control of power from a power supply (not shown) such as a battery to a load (not shown) such as a motor. Note that FIG. 1 and so forth show a state in which the in-vehicle-component circuit unit 10 is housed in a casing 14 of a battery pack 12 as an in-vehicle component, and is fastened thereto using first and second bolts 138 and 140, which will be described later. The in-vehicle-component circuit unit 10 and the in-vehicle component (battery pack 12 (casing 14)) are not shown entirely, but relevant parts thereof are selectively shown. While the in-vehicle-component circuit unit 10 may be disposed in any orientation, in the following description, the upper side refers to the upper side in FIG. 8, the lower side refers to the lower side in FIG. 8, the forward side refers to the right side in FIG. 5, the rear side refers to the left side in FIG. 5, the left side refers to the lower side in FIG. 5, and the right side refers to the upper side in FIG. 5. For a plurality of identical members, reference numerals may be assigned to some of the members, and reference numerals may be omitted for the other members.

In-Vehicle-Component Circuit Unit 10

The in-vehicle-component circuit unit 10 is configured to be housed in the casing 14 of the in-vehicle component (battery pack 12), and includes a circuit constituent member 16 and an insulating case 18 accommodating the circuit constituent member 16. The case 18 accommodates therein connection bus bars 30 (first connection bus bar 30*a* and second connection bus bar 30*b*) including internal connection portions 22 (first internal connection portion 22*a* and second internal connection portion 22*b*) configured to be conductively connected to circuit-side connection portions 20 (first circuit-side connection portion 20*a* and second circuit-side connection portion 20*b*) provided in the circuit constituent member 16, and external connection portions 28 (first external connection portion 28*a* and second external connection portion 28*b*) configured to be conductively connected to connector-side connection portions 26 (first connector-side connection portion 26*a* and second connector-side connection portion 26*b*) of a connector 24 provided on the casing 14.

Battery Pack 12

Figure 2:
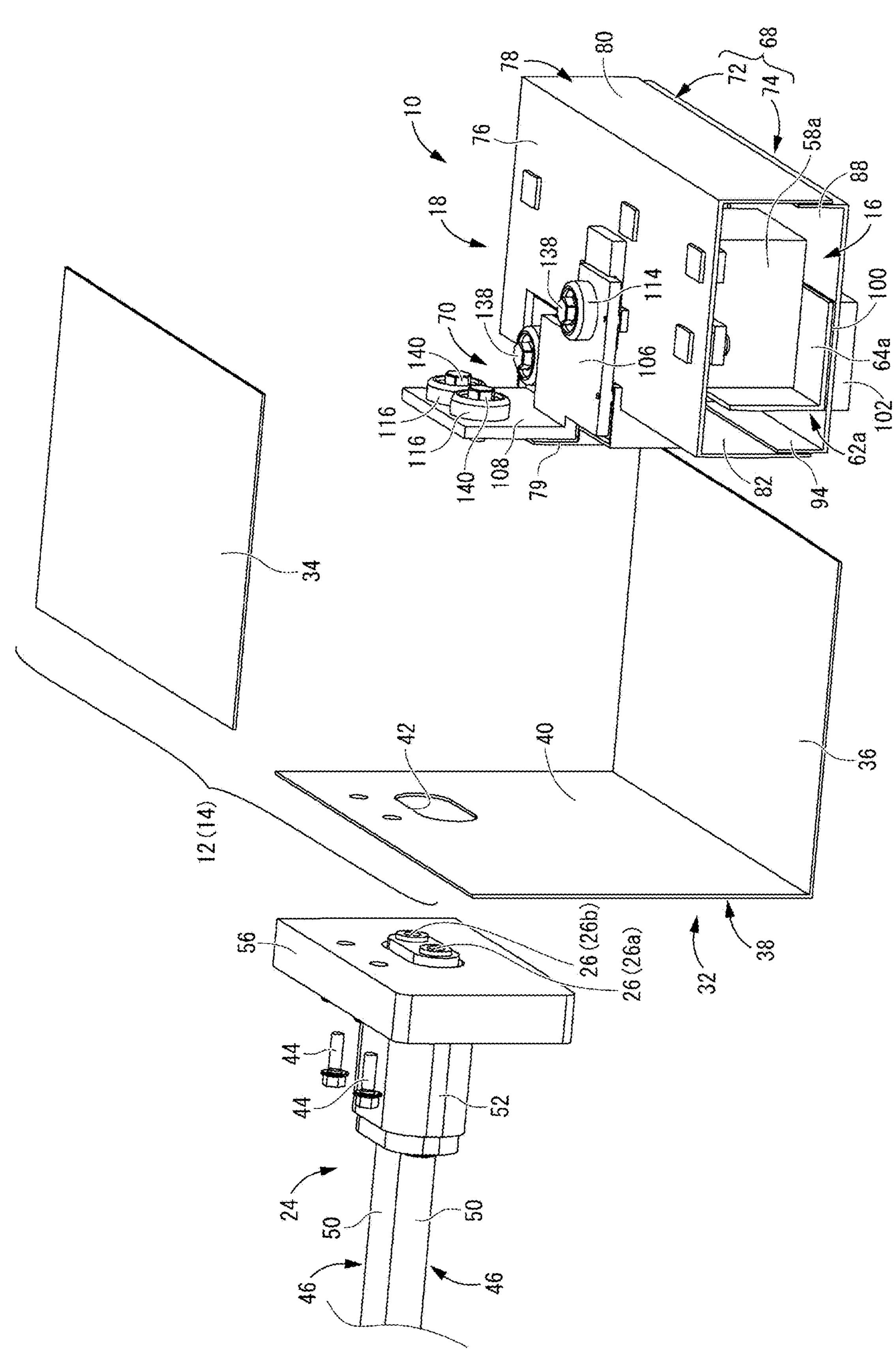
FIG. 2 is an exploded perspective view showing, in an exploded state, the state shown in FIG. 1 in which the in-vehicle-component circuit unit is housed in the casing of the in-vehicle component.

Although the in-vehicle component in which the in-vehicle-component circuit unit 10 is to be housed is not limited, the in-vehicle component is the battery pack 12 in the present embodiment. As also shown in FIG. 2, the casing 14 of the battery pack 12 includes a casing body 32 and a lid member 34. The casing body 32, for example, has a substantially box shape that is open upward, and includes a bottom wall 36, and a peripheral wall portion 38 protruding upward from a peripheral edge portion of the bottom wall 36. Note that FIG. 2 and so forth selectively show relevant portions of the battery pack 12 (casing 14), with only a rear wall portion 40 shown as the peripheral wall portion 38. However, wall portions constituting the peripheral wall portion 38 may be provided on the front side and the left and right sides of the bottom wall 36.

The rear wall portion 40 has a connector insertion hole 42 provided therein to enable the connector-side connection portions 26 (connector-side connection portions 26*a* and 26*b*) of the connector 24 to be inserted into the casing 14. The connector 24 can be attached to the casing 14 by inserting the connector-side connection portions 26 (connector-side connection portions 26*a* and 26*b*) into the casing body 32 through the connector insertion hole 42, and fastening the connector 24 to the casing body 32 using bolts 44. After the in-vehicle-component circuit unit 10 has been placed in the casing body 32 and electrically connected to the connector 24, the upper opening of the casing body 32 is covered with the lid member 34, which has a substantially flat plate shape, and the lid member 34 is fixed. Thus, the in-vehicle-component circuit unit 10 is housed in the casing 14.

Connector 24

Although the shape of the connector 24 is not limited, the connector 24 includes a pair of wires 46 and 46 in the present embodiment. Each of the wires 46 is a coated wire, and includes a core wire 48 and an insulating coating 50 externally fitted to the core wire 48. At an end portion (front end portion) of each of the wires 46, the insulating coating 50 is stripped off to expose the core wire 48. The core wire 48 exposed as a result of the insulating coating 50 having been stripped off is electrically connected to a connector terminal 54 in a connector housing 52 made of an insulating synthetic resin or the like. That is, due to the provision of the connector terminals 54 at end portions of the wires 46, the connector 24 includes a pair of connector terminals 54 and 54, and the connector terminals 54 and 54 are arranged in the left-right direction.

Each of the connector terminals 54 has a fastening hole provided in a front end portion thereof. In the present embodiment, these fastening holes constitute the first and second connector-side connection portions 26*a* and 26*b*. In short, the connection bus bars 30 of the in-vehicle-component circuit unit 10 and the connector 24 are to be conductively connected to each other by passing later-described second bolts 140 and 140 through the external connection portions 28 (first and second external connection portions 28*a* and 28*b*) of the connection bus bars 30 of the in-vehicle-component circuit unit 10, and fastening the second bolts 140 and 140 to the fastening holes (first and second connector-side connection portions 26*a* and 26*b*) of the connector terminals 54 and 54 of the connector 24.

Note that the connector housing 52 is fixed to the casing body 32 via an attachment portion 56 having a predetermined thickness. That is, the attachment portion 56 has insertion holes through which the connector-side connection portions 26*a* and 26*b* of the connector 24 and the bolts 44 and 44 are passed. While the connector 24 is fixed to the casing body 32 using the bolts 44, the connector-side connection portions 26*a* and 26*b* pass through the attachment portion 56 and are exposed into the casing body 32 through the connector insertion hole 42 of the rear wall portion 40.

Circuit Constituent Member 16

Figure 3:
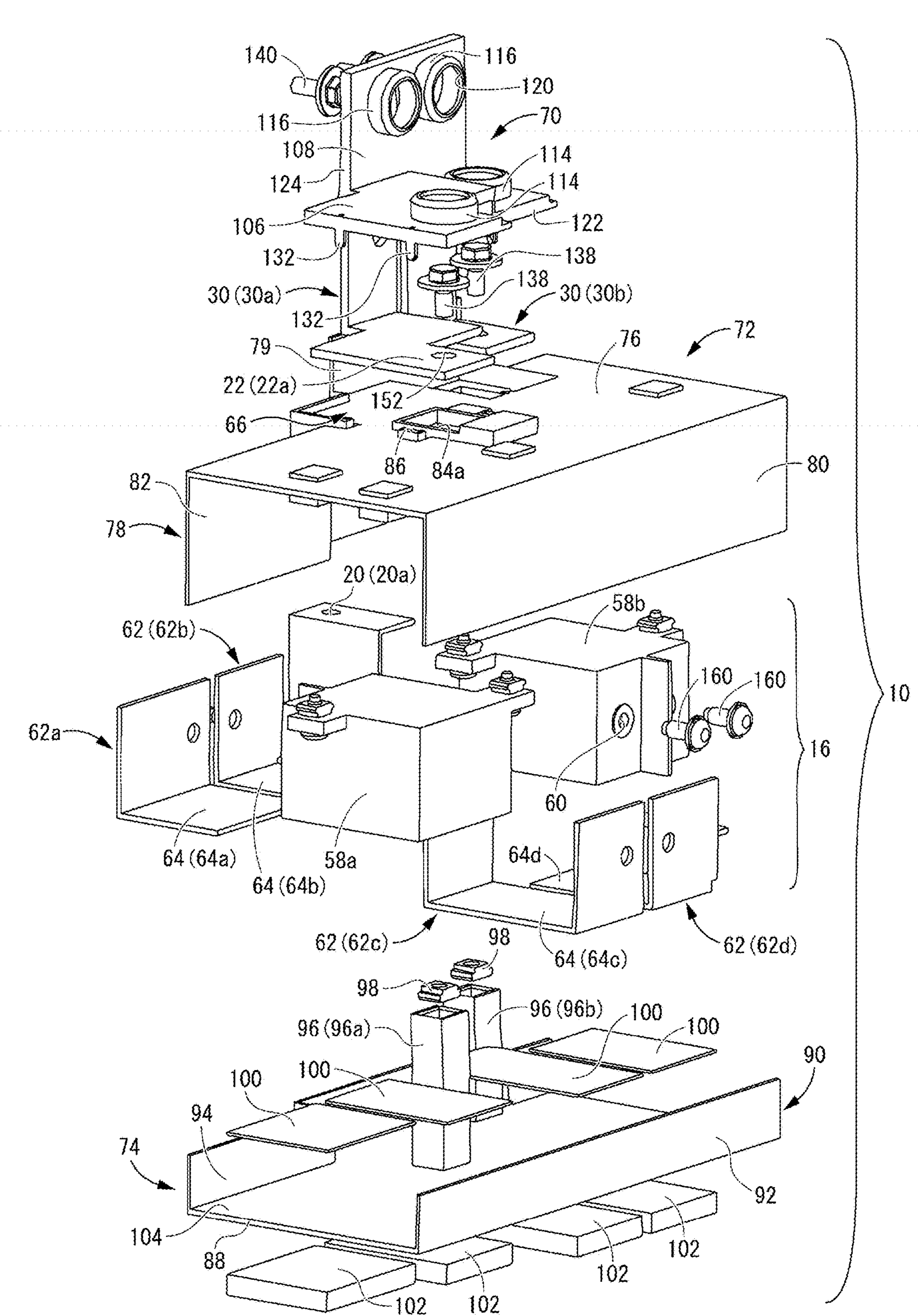
FIG. 3 is an exploded perspective view showing the exploded state of the in-vehicle-component circuit unit shown in FIG. 2, as viewed from the front side.
Figure 4:
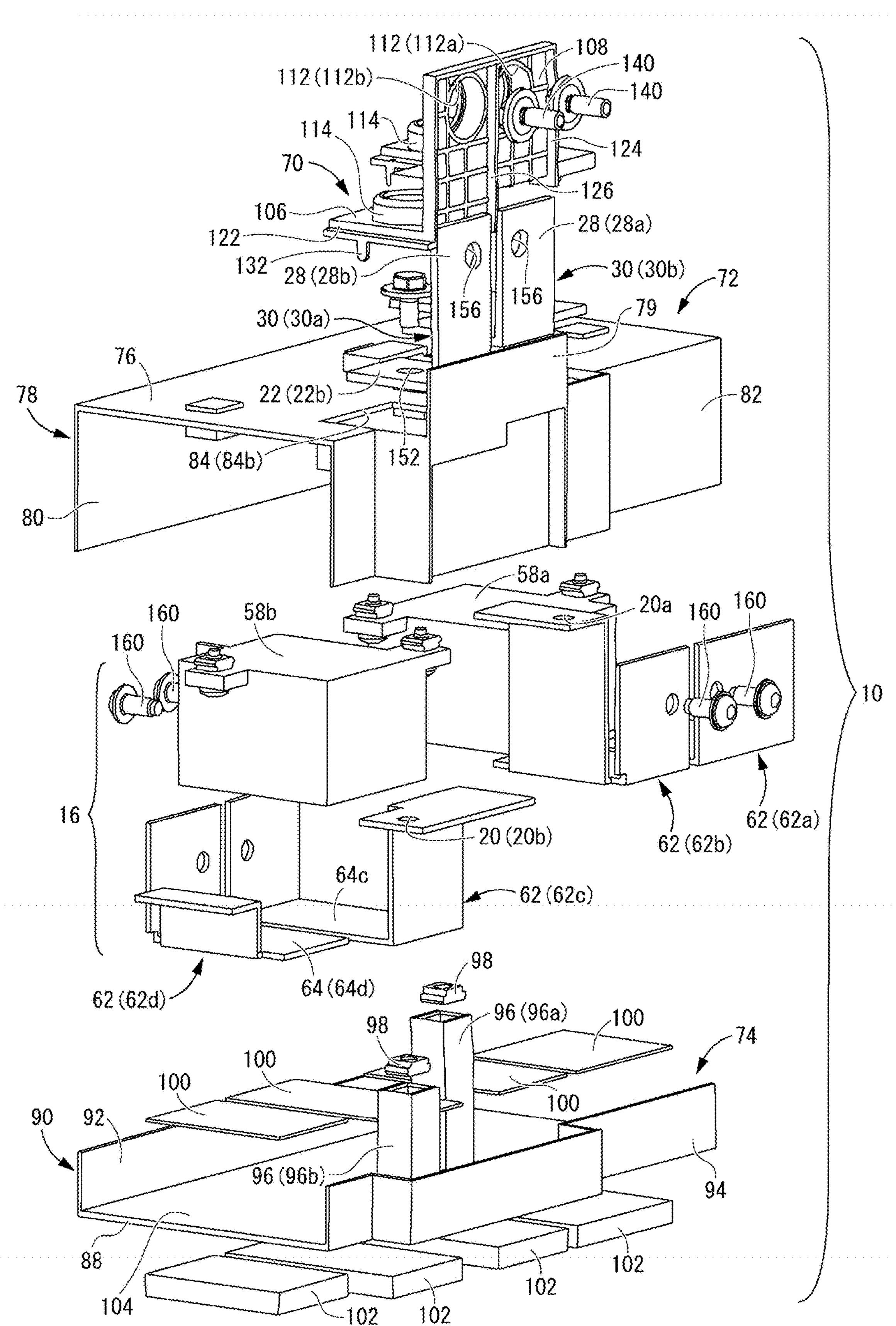
FIG. 4 is an exploded perspective view showing the exploded state of the in-vehicle-component circuit unit shown in FIG. 3, as viewed from the rear side.
Figure 5:
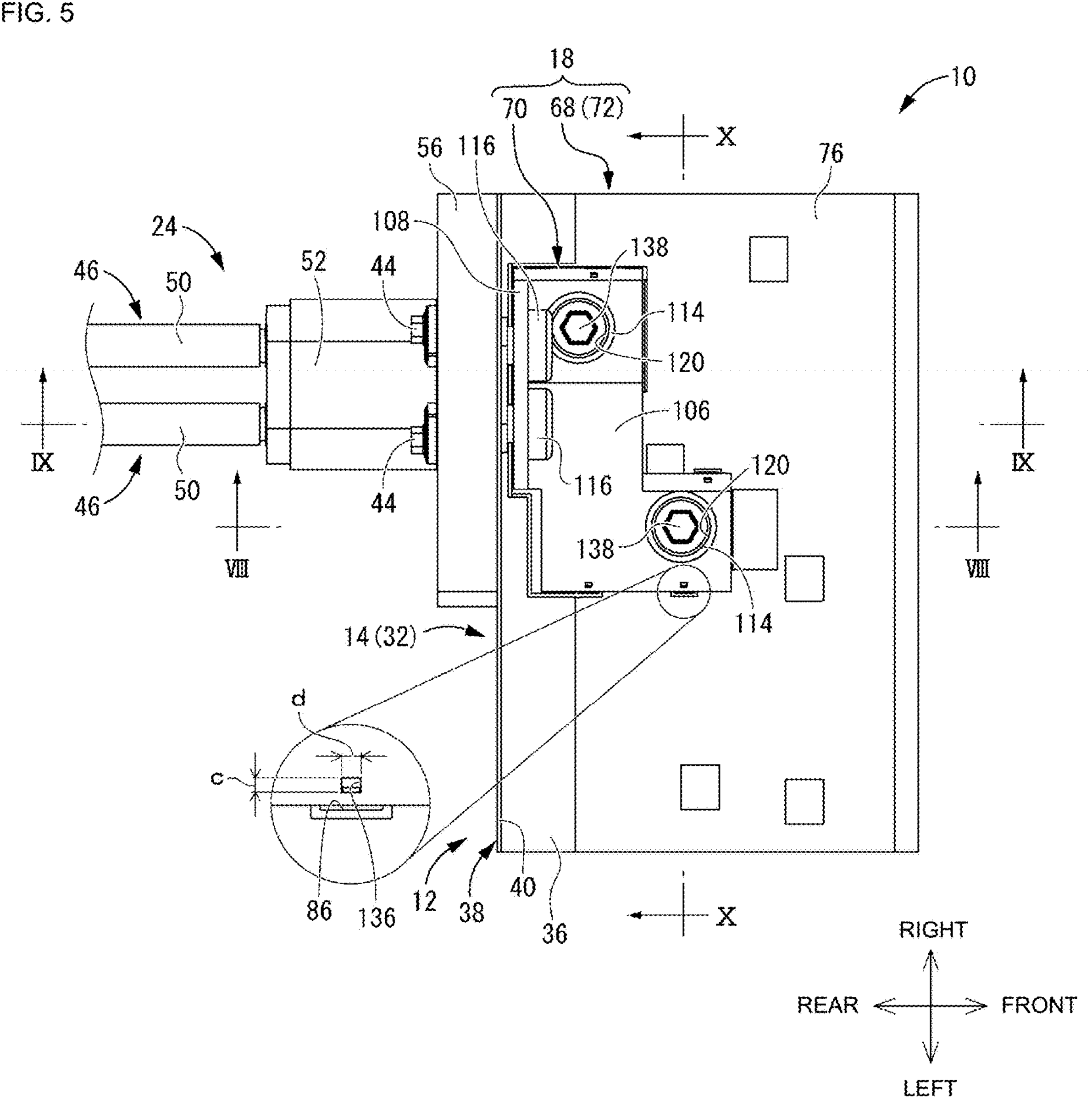
FIG. 5 is a plan view showing the in-vehicle-component circuit unit housed in the casing of the in-vehicle component shown in FIG. 1, with a lid member of the casing omitted therefrom.
Figure 6:
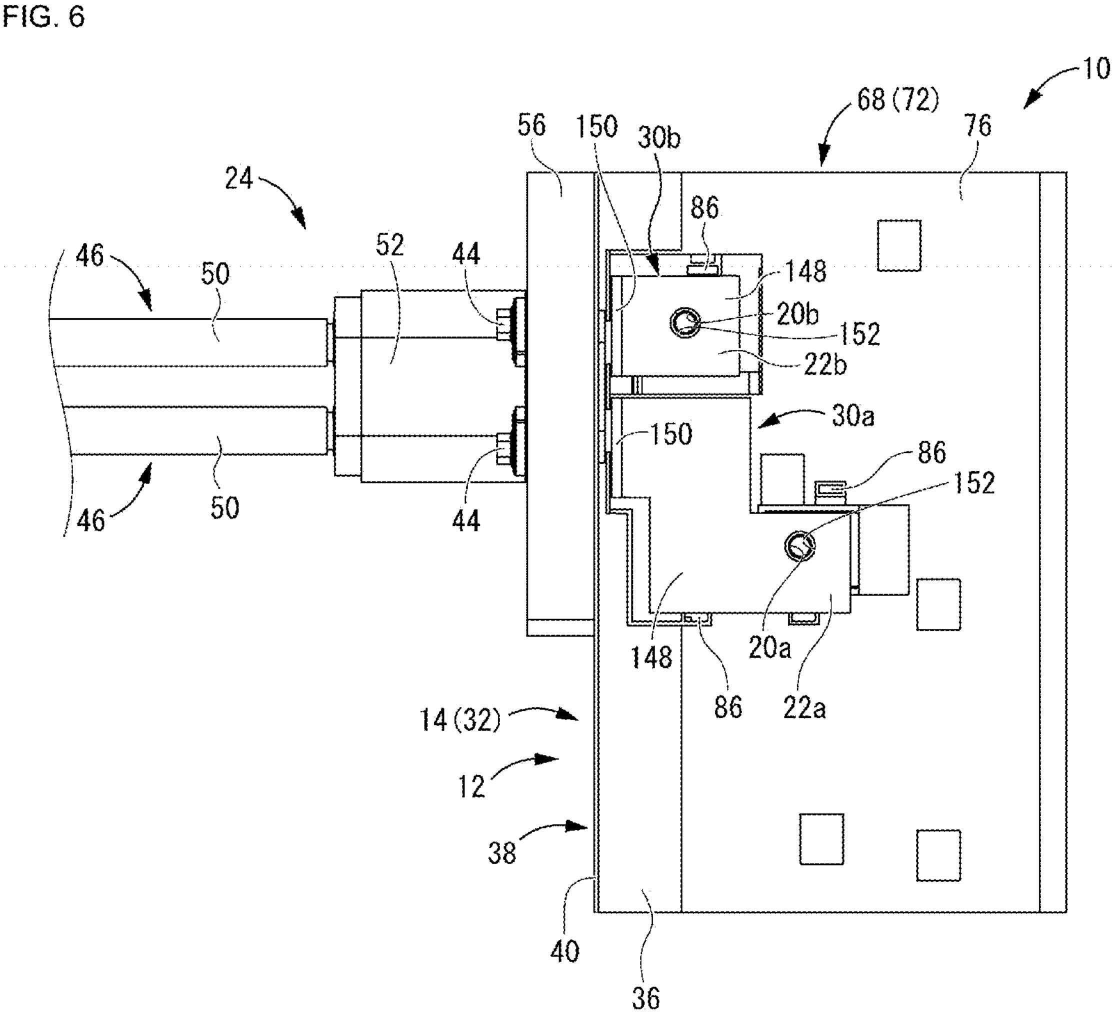
FIG. 6 is a plan view showing the in-vehicle-component circuit unit shown in FIG. 5, with a cover part omitted therefrom.

In the present embodiment, as also shown in FIGS. 3 and 4, the circuit constituent member 16 includes a pair of relays (first relay 58*a* and second relay 58*b*), and conduction bus bars 62 (first to fourth conduction bus bars 62*a* to 62*d*) to be connected to a pair of connection portions 60 and 60 provided in each of the relays 58*a* and 58*b*. In the present embodiment, the first relay 58*a* and the second relay 58*b* are disposed so as to face opposite sides to each other, with the left first relay 58*a* disposed facing rearward, and the right second relay 58*b* disposed facing forward.

A first conduction bus bar 62*a* is connected to the left connection portion 60 of the first relay 58*a*, and the first conduction bus bar 62*a* is electrically connected to an external circuit (not shown) on the left side of the in-vehicle-component circuit unit 10. A second conduction bus bar 62*b* is connected to the right connection portion 60 of the first relay 58*a*. An end portion, of the second conduction bus bar 62*b*, on a side opposite to a side connected to the first relay 58*a* protrudes above the first relay 58*a* via a later-described heat dissipation portion 64 (second heat dissipation portion 64*b*) located below the second conduction bus bar 62*b*, and constitutes the first circuit-side connection portion 20*a*. In particular, the first circuit-side connection portion 20*a* is constituted by a bolt insertion hole passing through the second conduction bus bar 62*b* in a plate thickness direction (up-down direction) at the end portion on the side opposite to the side connected to the first relay 58*a*.

Furthermore, a third conduction bus bar 62*c* is connected to the left connection portion 60 of the second relay 58*b*. An end portion, of the third conduction bus bar 62*c*, on a side opposite to a side connected to the second relay 58*b* protrudes above the second relay 58*b* via a later-described heat dissipation portion 64 (third heat dissipation portion 64*c*) located below the third conduction bus bar 62*c*, and constitutes the second circuit-side connection portion 20*b*. In particular, the second circuit-side connection portion 20*b* is constituted by a bolt insertion hole passing through the third conduction bus bar 62*c* in a plate thickness direction (up-down direction) at the end portion located on the side opposite to the side connected to the second relay 58*b*. Furthermore, a fourth conduction bus bar 62*d* is connected to the right connection portion 60 of the second relay 58*b*, and the fourth conduction bus bar 62*d* is electrically connected to the external circuit (not shown) on the right side of the in-vehicle-component circuit unit 10.

The conduction bus bars 62 (first to fourth conduction bus bars 62*a* to 62*d*) are each made of a conductive metal plate material, and formed by bending the metal plate material into a predetermined shape by press working or the like. The first to fourth conduction bus bars 62*a* to 62*d* each have a lower portion extending in a horizontal direction (direction orthogonal to the up-down direction), and these lower portions extending in the horizontal direction constitute heat dissipation portions 64 (first to fourth heat dissipation portions 64*a* to 64*d*). As will be described later, the first and second connection bus bars 30*a* and 30*b* are connected to the second and third conduction bus bars 62*b* and 62*c*. Therefore, the first and second connection bus bars 30*a* and 30*b* indirectly include the heat dissipation portions 64 (second and third heat dissipation portions 64*b* and 64*c*) via the second and third conduction bus bars 62*b* and 62*c*.

Case 18

The case 18 includes a case body 68 including a placement portion 66 on which the connection bus bars 30 are placed, and a cover part 70 covering the placement portion 66 and attached to the case body 68.

Case Body 68

The case body 68 includes an upper case 72 and a lower case 74 that are assembled to each other in the up-down direction. The upper case 72 and the lower case 74 have box shapes that are open upward and downward, respectively, and are each made of a hard synthetic resin, for example. That is, the upper case 72 has an upper wall 76 having a substantially rectangular shape as a whole, and an upper peripheral wall 78 protruding downward from a peripheral edge portion of the upper wall 76. A rear end wall portion 79 protruding upward is provided at a right portion at a rear end of the upper wall 76. Note that FIGS. 3, 4 and so forth selectively show relevant portions of the in-vehicle-component circuit unit 10, showing only the upper front wall 80 and the upper rear wall 82 as the upper peripheral wall 78. However, wall portions constituting the upper peripheral wall 78 may be provided on left and right sides of the upper wall 76.

Figure 7:
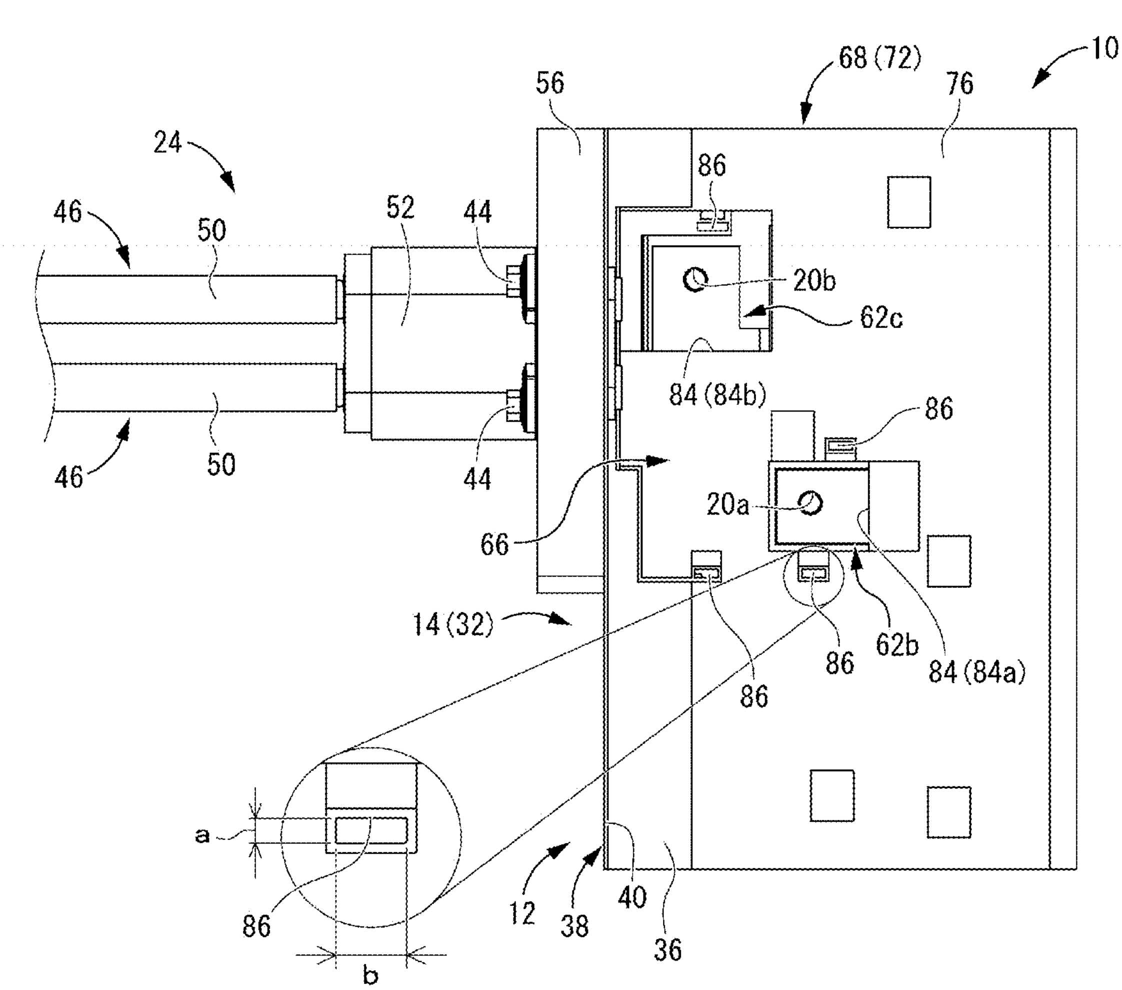
FIG. 7 is a plan view showing the in-vehicle-component circuit unit shown in FIG. 6, with connection bus bars omitted therefrom.

As also shown in FIG. 7, the upper wall 76 has at least one substantially rectangular through window 84 passing therethrough in the plate thickness direction (up-down direction). In the present embodiment, through windows 84 (first through window 84*a* and second through window 84*b*) are provided in two locations of the upper wall 76. The first through window 84*a* and the second through window 84*b* are provided at positions respectively corresponding to the first circuit-side connection portion 20*a* of the second conduction bus bar 62*b* and the second circuit-side connection portion 20*b* of the third conduction bus bar 62*c*. Specifically, the first through window 84*a* is provided at a substantially central portion of the upper wall 76, and the second through window 84*b* is provided at a right rear portion of the upper wall 76. Accordingly, while the circuit constituent member 16 is accommodated in the case body 68, the first circuit-side connection portion 20*a* and the second circuit-side connection portion 20*b* are exposed to the exterior through the first through window 84*a* and the second through window 84*b*.

As will be described later, the connection bus bars 30 (first connection bus bar 30*a* and second connection bus bar 30*b*) are overlaid from above with the first circuit-side connection portion 20*a* and the second circuit-side connection portion 20*b* exposed through the first through window 84*a* and the second through window 84*b*. A region of the upper wall 76 in which the first connection bus bar 30*a* and the second connection bus bar 30*b* are placed and overlaid constitutes the placement portion 66. In the present embodiment, the placement portion 66 is formed including a region of the upper wall 76 that extends from the first through window 84*a* to the second through window 84*b*, that is, including, for example, a region extending from a rear portion of the first through window 84*a* to a left portion of the second through window 84*b*.

At least one fitting hole 86 extending through the upper wall 76 in the plate thickness direction is provided in an area surrounding the placement portion 66. The fitting hole 86 is configured to be fitted to a later-described fitting projection 132 provided on the cover part 70. In the present embodiment, a plurality of fitting holes 86 are provided, including three fitting holes 86 in an area surrounding the first through window 84*a*, and one fitting hole 86 in an area surrounding the second through window 84*b*. The fitting holes 86 each have a substantially rectangular shape extending in the front-rear direction, which is one of tolerance absorbing directions described later, and have an opening width dimension b (see FIG. 7) in the front-rear direction that is larger than an opening width dimension a (see FIG. 7) in the left right direction.

The lower case 74 includes a lower wall 88 having a substantially rectangular shape as a whole, and a lower peripheral wall 90 protruding upward from a peripheral edge portion of the lower wall 88. Note that FIGS. 3, 4 and so forth selectively show relevant portions of the in-vehicle-component circuit unit 10, showing only a lower front wall 92 and a lower rear wall 94 as the lower peripheral wall 90. However, wall portions constituting the lower peripheral wall 90 may be provided on left and right sides of the lower wall 88.

As also shown in FIGS. 3 and 4, at least one upwardly protruding bus bar fixing portion 96 having a substantially rectangular columnar shape is provided on the lower wall 88. In the present embodiment, bus bar fixing portions 96 (first bus bar fixing portion 96*a* and second bus bar fixing portion 96*b*) are provided at two locations of the lower wall 88. The first bus bar fixing portion 96*a* and the second bus bar fixing portion 96*b* are provided at positions respectively corresponding to the first circuit-side connection portion 20*a* of the second conduction bus bar 62*b* and the second circuit-side connection portion 20*b* of the third conduction bus bar 62*c*. Specifically, the first bus bar fixing portion 96*a* is provided at a substantially central portion of the lower wall 88, and the second bus bar fixing portion 96*b* is provided at a right rear portion of the lower wall 88. A nut 98 is provided in an embedded state at an upper end portion of each of the first and second bus bar fixing portions 96*a* and 96*b*.

While the circuit constituent member 16 is accommodated in the case body 68, the heat dissipation portions 64 (first to fourth heat dissipation portions 64*a* to 64*d*) of the conduction bus bars 62 (first to fourth conduction bus bars 62*a* to 62*d*) are overlaid with the lower wall 88 of the lower case 74. Substantially sheet-shaped heat transfer sheets 100 each made of a material having relatively good heat transfer efficiency are provided between the heat dissipation portions 64*a* to 64*d* and the lower wall 88, and the heat dissipation portions 64*a* to 64*d* come into contact with the lower wall 88 via the corresponding heat transfer sheets 100. As will be described later, the lower wall 88 of the case body 68 will be overlaid with the bottom wall 36 of the casing 14 of the battery pack 12. At positions respectively corresponding to the heat transfer sheets 100 between the lower wall 88 and the bottom wall 36, gap fillers 102 each made of a material having a relatively good heat transfer efficiency are provided, and the lower wall 88 comes into contact with the bottom wall 36 via the gap fillers 102. That is, heat generated due to energization of the relays 58*a* and 58*b* is dissipated from the bottom wall 36 via the heat dissipation portions 64*a* to 64*d*, the heat transfer sheets 100, the lower wall 88, and the gap fillers 102. Accordingly, in the present embodiment, the heat transfer surface 104, which is provided on the case body 68 and comes into contact with the heat dissipation portions 64*a* to 64*d* to transfer the heat generated due to energization of the relays 58*a* and 58*b*, is constituted by the upper surface of the lower wall 88.

The materials of the heat transfer sheets 100 and the gap fillers 102 are not limited as long as the materials are insulating. For example, the heat transfer sheets 100 and the gap fillers 102 may be made of a synthetic resin having higher thermal conductivity than the air. Specifically, it is possible to use a silicone resin or a non-silicone resin such as an acrylic resin or a ceramic resin. More specific examples include a heat dissipation sheet, a heat dissipation gap filler, a heat-conductive grease, and a heat-conductive silicone rubber that are made of a silicone resin. Note that the heat transfer member provided between each of the heat dissipation portions 64*a* to 64*d* and the lower wall 88 is not limited to a sheet-shaped heat transfer member, and any known heat transfer member may be used. Although the gap fillers 102 are shown to have a substantially rectangular block shape in FIGS. 3 and 4, the shape of the gap fillers 102 is not limited, and any known gap filler (heat transfer member) may be used.

In particular, the heat transfer sheets 100 and the gap fillers 102 are elastically deformable in the thickness direction (up-down direction), and elastic deformation of the heat transfer sheets 100 and the gap fillers 102 in the up-down direction may also enable tolerances in the up-down direction between the in-vehicle-component circuit unit 10 and the casing 14 of the battery pack 12 to be absorbed during an operation of bolt fastening the external connection portions 28*a* and 28*b* and the connector-side connection portions 26*a* and 26*b* to each other using the second bolts 140.

Cover Part 70

Figure 11:
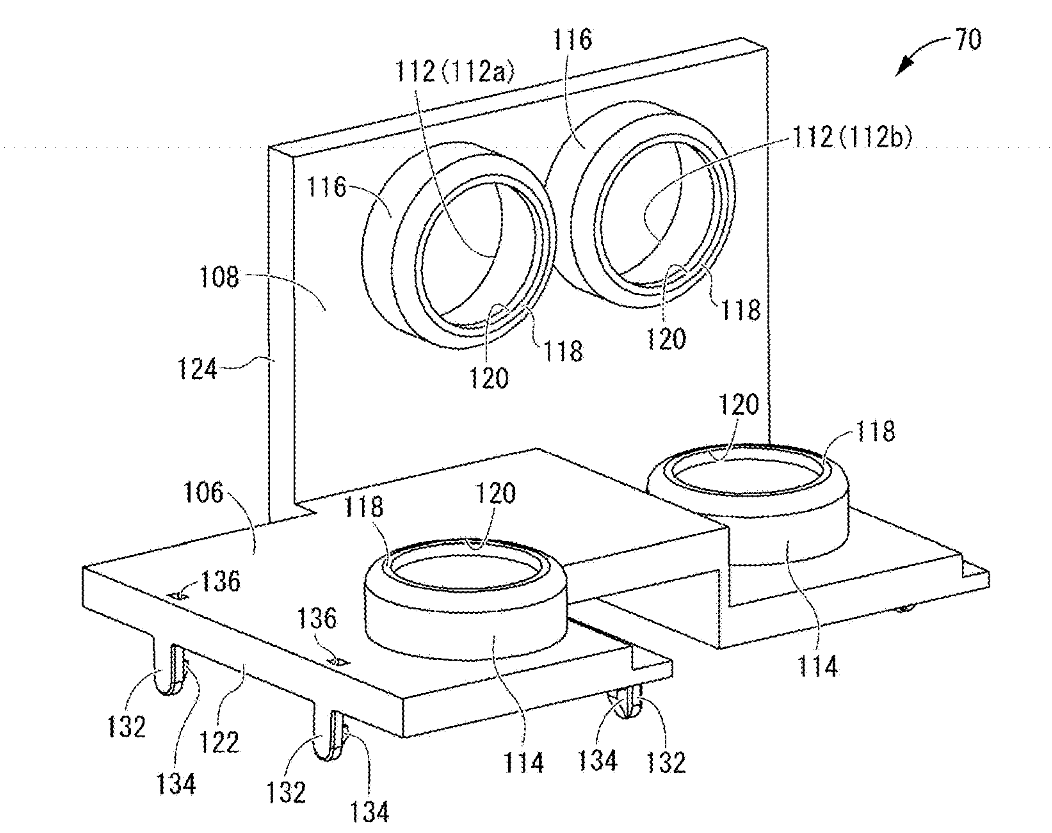
FIG. 11 is an enlarged perspective view showing the cover part constituting a part of the in-vehicle-component circuit unit shown in FIG. 1, as viewed from a plane side.
Figure 12:
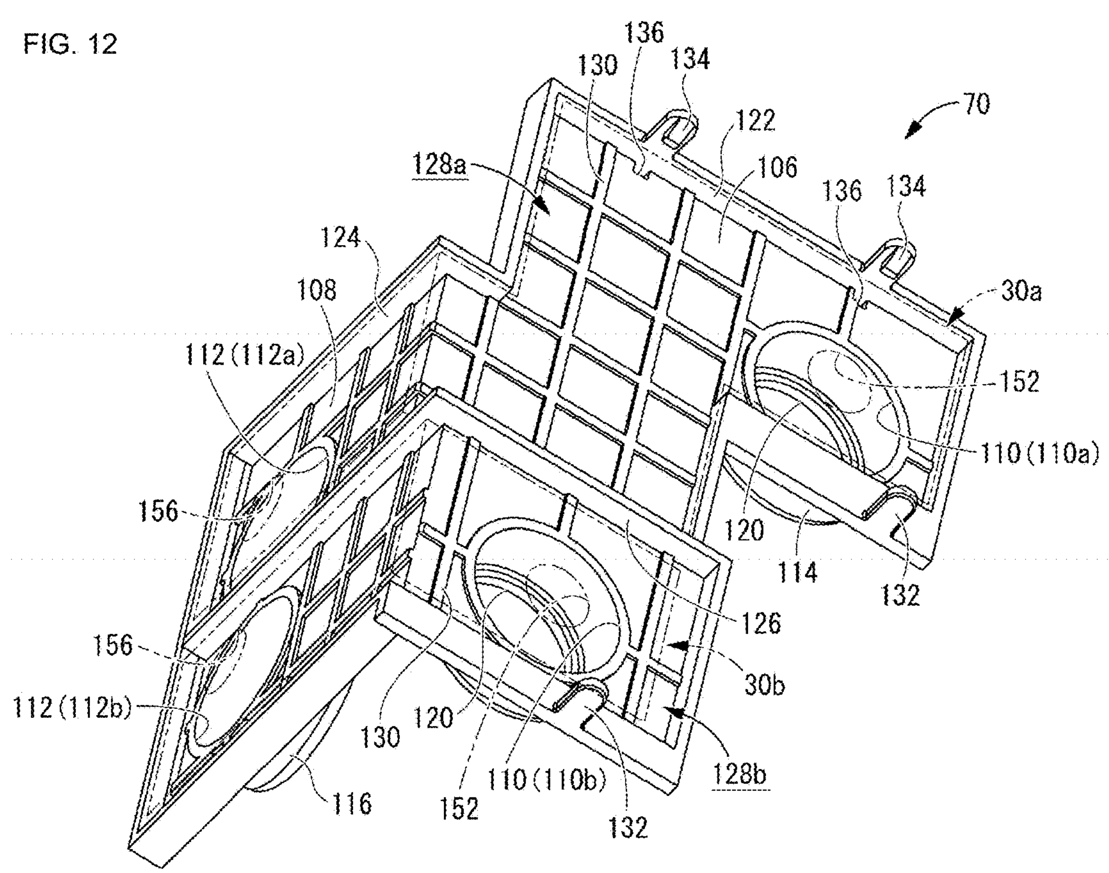
FIG. 12 is a perspective view of the cover part shown in FIG. 11, as viewed from the bottom side.
Figure 13:
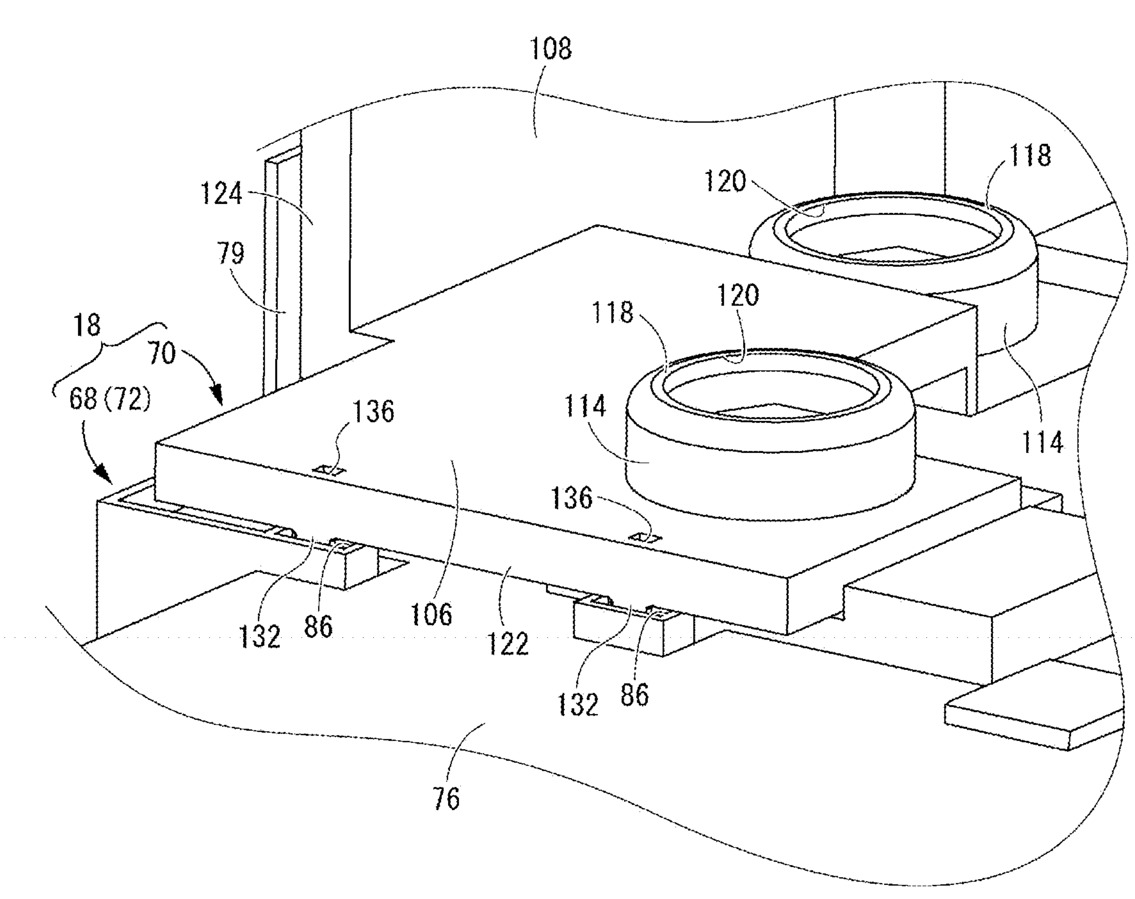
FIG. 13 is an enlarged perspective view showing relevant portions of fitting portions between fitting holes and fitting projections of the in-vehicle-component circuit unit shown in FIG. 1.

The cover part 70 has a shape covering the placement portion 66 of the case body 68 and spanning the first through window 84*a* of the upper case 72 and the second through window 84*b*. That is, as also shown in FIGS. 11 and 12, the cover part 70 includes a horizontal wall portion 106 extending in the left-right direction and extending in a substantially horizontal direction (direction orthogonal to the up-down direction). In addition, a vertical wall portion 108 protruding upward and extending in the up-down direction is provided at a right portion at a rear end of the horizontal wall portion 106. Thus, the cover part 70 has a substantially L-shaped longitudinal cross section at the right portion.

The horizontal wall portion 106 of the cover part 70 is provided with first window portions 110 passing therethrough in the plate thickness direction (up-down direction) at positions corresponding to the through windows 84 and the circuit-side connection portions 20 exposed through the through windows 84, while the cover part 70 is attached to the case body 68. In the present embodiment, the horizontal wall portion 106 is provided with a left first window portion 110*a* and a right first window portion 110*b* at positions respectively corresponding to the first and second circuit-side connection portions 20*a* and 20*b*. Furthermore, the vertical wall portion 108 is provided with second window portions 112 passing therethrough in the plate thickness direction (front-rear direction) at positions corresponding to the connector-side connection portions 26, while the in-vehicle-component circuit unit 10 is housed in the casing 14 of the battery pack 12. In the present embodiment, the vertical wall portion 108 is provided with a left second window portion 112*a* and a right second window portion 112*b* at positions respectively corresponding to the first and second connector-side connection portions 26*a* and 26*b*.

As will be described later, the first and second circuit-side connection portions 20*a* and 20*b* are overlaid with and conductively connected to the internal connection portions 22 (first and second internal connection portions 22*a* and 22*b*) of the connection bus bars 30*a* and 30*b*. Accordingly, the left and right first window portions 110*a* and 110*b* are provided at positions corresponding to the first and second internal connection portions 22*a* and 22*b*. That is, in an assembled state of the in-vehicle-component circuit unit 10, the left and right first window portions 110*a* and 110*b* are disposed facing, in the up-down direction, the internal connection portions 22*a* and 22*b* and first bolt insertion holes 152 respectively provided in the internal connection portions 22*a* and 22*b*. The first and second connector-side connection portions 26*a* and 26*b* are overlaid with and conductively connected to the external connection portions 28 (first and second external connection portions 28*a* and 28*b*) of the connection bus bars 30*a* and 30*b*. Accordingly, the left and right second window portions 112*a* and 112*b* are provided at positions corresponding to the first and second external connection portions 28*a* and 28*b*. That is, in the assembled state of the in-vehicle-component circuit unit 10, the left and right second window portions 112*a* and 112*b* are disposed facing, in the front-rear direction, the external connection portions 28*a* and 28*b* and second bolt insertion holes 156 respectively provided in the external connection portions 28*a* and 28*b*.

Figure 8:
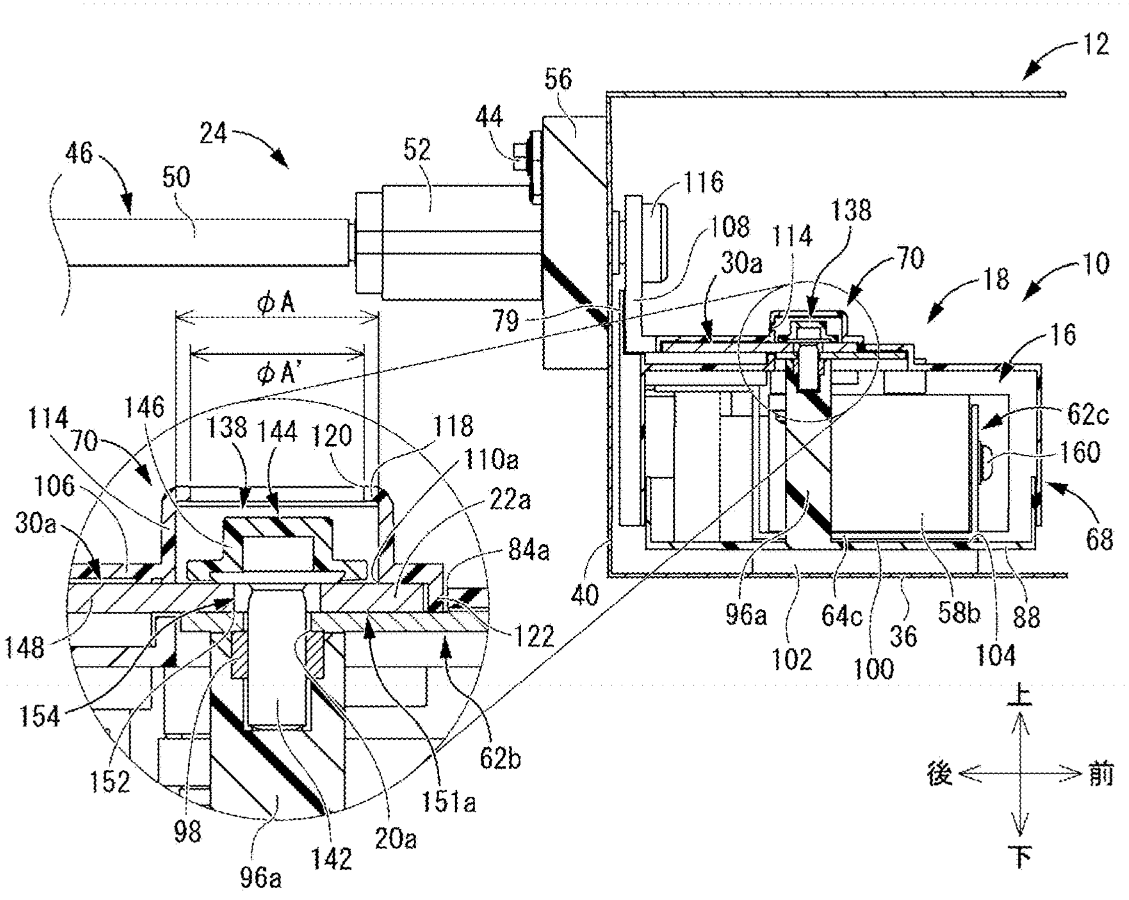
FIG. 8 is a cross-sectional view taken along the line VIII-VIII in FIG. 5.
Figure 9:
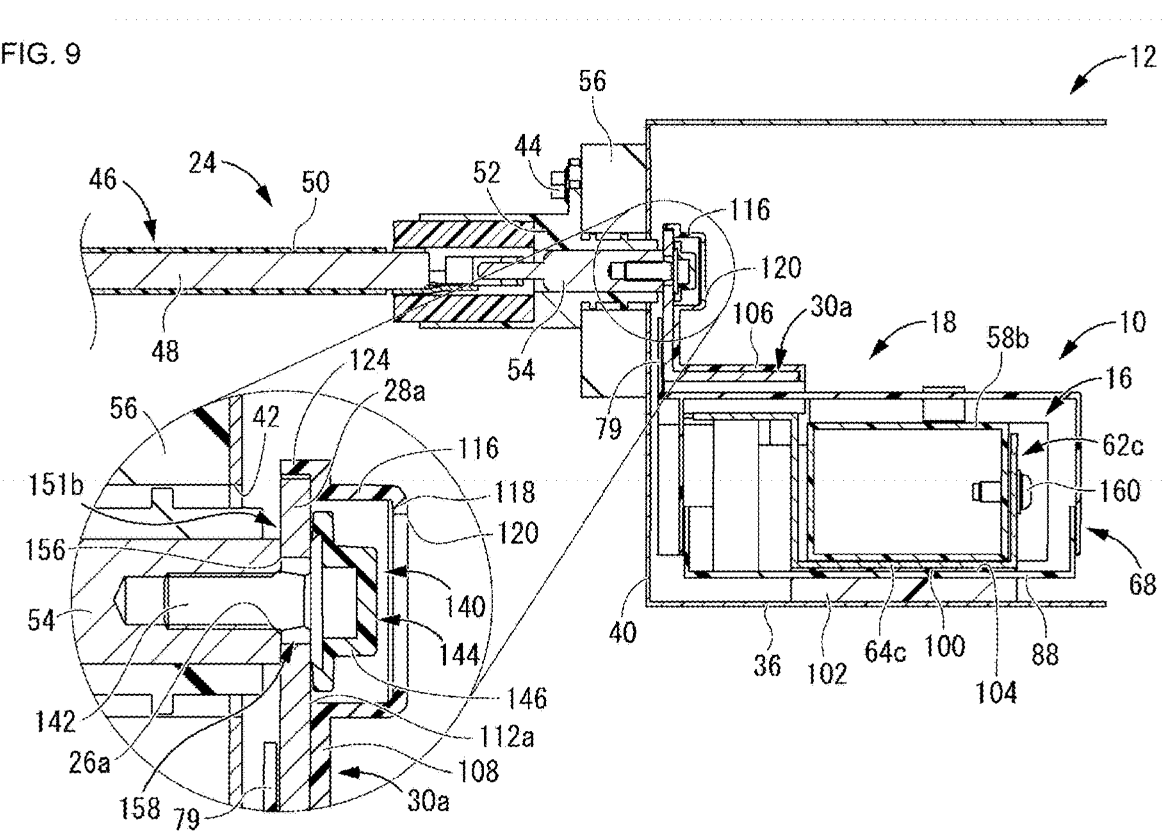
FIG. 9 is a cross-sectional view taken along the line IX-IX in FIG. 5.

In the present embodiment, the left and right first window portions 110*a* and 110*b* and the left and right second window portions 112*a* and 112*b* have the same shape, and each formed as a circular through hole having a predetermined inner diameter dimension ϕA (see FIG. 8). The inner diameter dimension ϕA of the left and right first window portions 110*a* and 110*b* may be sized to allow passage of a tool for performing, from the exterior of at least the case 18, an operation of bolt fastening the internal connection portions 22*a* and 22*b* and the circuit-side connection portions 20*a* and 20*b* to each other using first bolts 138, which will be described later. In the present embodiment, the inner diameter dimension ϕA of the left and right first window portions 110*a* and 110*b* is larger than a maximum outer diameter dimension ϕC (see FIG. 14) of head portions 144 of first bolts 138 including insulated portions 146, which will be described later. Similarly, the inner diameter dimension ϕA of the left and right second window portions 112*a* and 112*b* may have a size that allows passage of a tool for performing, from the exterior of at least the case 18, an operation of bolt fastening the external connection portions 28*a* and 28*b* and the connector-side connection portions 26*a* and 26*b* to each other using second bolts 140, which will be described later. In the present embodiment, the inner diameter dimension ϕA of the left and right second window portions 112*a* and 112*b* is larger than a maximum outer diameter dimension ϕC of head portions 144 of second bolts 140 including insulated portions 146, which will be described later.

First tubular portions 114 and 114 in the form of tubular portions protruding upward from peripheral edges of the left and right first window portions 110*a* and 110*b*, respectively, are provided on the horizontal wall portion 106, and second tubular portions 116 and 116 in the form of tubular portions protruding forward from peripheral edges of the left and right second window portions 112*a* and 112*b*, respectively, are provided on the vertical wall portion 108. That is, all of the first and second tubular portions 114 and 116 protrude outward of the cover part 70 and the case 18 formed by attaching the cover part 70.

The first and second tubular portions 114 and 116 each have a predetermined protruding height dimension. Also, a retaining projection 118 protruding radially inward is provided on the protruding distal end side of each of the first and second tubular portions 114 and 116. In the present embodiment, the retaining projection 118 is formed with a circular ring shape extending fully circumferentially around the protruding distal ends of the first and second tubular portions 114 and 116. Thus, an outer opening portion 120 of each of the first and second tubular portions 114 and 116 has a predetermined inner diameter dimension, and the first and second tubular portions 114 and 116 have an inner diameter dimension (inner diameter dimension of the retaining projection 118) ϕA' (see FIG. 8) that is smaller than the inner diameter dimension ϕA of the first window portions 110*a* and 110*b*.

Furthermore, a lower protection wall portion 122 protruding downward is provided at a peripheral edge of the horizontal wall portion 106, and a rear protection wall portion 124 protruding rearward is provided at a peripheral edge of the vertical wall portion 108. The lower protection wall portion 122 and the rear protection wall portion 124 are formed continuously over substantially the entire perimeters of the horizontal wall portion 106 and the vertical wall portion 108, and formed so as to be continuous and integrated with each other at the connection portion between the horizontal wall portion 106 and the vertical wall portion 108. Furthermore, a partition wall portion 126 dividing a region surrounded by the lower protection wall portion 122 and the rear protection wall portion 124 into two regions is provided on the lower surface of the horizontal wall portion 106 and the rear surface of the vertical wall portion 108. That is, the partition wall portion 126 has a substantially L-shape spanning the horizontal wall portion 106 and the vertical wall portion 108. Also, of the two regions divided by the partition wall portion 126, the left region constitutes a first accommodating region 128*a* in which the first connection bus bar 30*a* is accommodated, and the right region constitutes a second accommodating region 128*b* in which the second connection bus bar 30*b* is accommodated.

In FIG. 12, the first and second connection bus bars 30*a* and 30*b* accommodated in the first and second accommodating region 128*a* and 128*b* are indicated by the dashed double-dotted lines. As also shown in FIG. 12, the connection bus bars 30*a* and 30*b* face the wall portions 122, 124, and 126, which constitute the accommodating regions 128*a* and 128*b*, with a slight gap in the front-rear direction and the left-right direction, and the connection bus bars 30*a* and 30*b* are slightly displaceable in the left-right direction in the accommodating regions 128*a* and 128*b*. Note that a later-described vertical portion 150 of each of the connection bus bars 30*a* and 30*b* is sandwiched between the vertical wall portion 108 (later-described ribs 130) of the cover part 70 and the rear end wall portion 79 of the upper case 72 in the front-rear direction. Accordingly, displacement of the connection bus bars 30*a* and 30*b* in the front-rear direction in the accommodating regions 128*a* and 128*b* is substantially impossible. As will be described later, the cover part 70 is displaceable relative to the case body 68 (upper case 72) in the front-rear direction, and therefore the connection bus bars 30*a* and 30*b* are displaceable together with the cover part 70 relative to the case body 68 (upper case 72) in the front-rear direction.

Inside the region surrounded by the lower protection wall portion 122 and the rear protection wall portion 124, ribs 130 protruding toward the placement portion 66 and the rear end wall portion 79, respectively, are provided on the lower surface of the horizontal wall portion 106 and the rear surface of the vertical wall portion 108. That is, the ribs 130 are provided in both the first accommodating region 128*a* and the second accommodating region 128*b* divided by the partition wall portion 126. In the present embodiment, a plurality of ribs 130 are provided, and each of the ribs 130 is formed as a protrusion extending in the front-rear direction or the left-right direction. The plurality of ribs 130 constitute a grid pattern as a whole, and are integrally formed.

When the cover part 70 is attached to the upper case 72 while the connection bus bars 30*a* and 30*b* are accommodated in the first and second accommodating region 128*a* and 128*b*, the ribs 130 are slightly compressed between the connection bus bars 30*a* and 30*b* and the horizontal wall portion 106 and the vertical wall portion 108, or the ribs 130 and the connection bus bars 30*a* and 30*b* abut against each other with zero touch, or the ribs 130 and the connection bus bars 30*a* and 30*b* face each other with a slight separation therebetween. That is, when the ribs 130 are compressed, the elastic restoring force of the ribs 130 causes the connection bus bars 30*a* and 30*b* to be pressed against the upper wall 76 (placement portion 66) and the rear end wall portion 79 of the upper case 72 from above and the front. During assembly of the in-vehicle-component circuit unit 10, the ribs 130 suppress the connection bus bars 30*a* and 30*b* from being lifted from the placement portion 66, thus limiting upward displacement of the second and third conduction bus bars 62*b* and 62*c* that come into contact with the connection bus bars 30*a* and 30*b* from below. This allows the second and third heat dissipation portions 64*b* and 64*c* of the second and third conduction bus bars 62*b* and 62*c* to more reliably come into contact with the heat transfer surface 104 of the lower wall 88 of the lower case 74 via the heat transfer sheets 100.

Furthermore, the lower protection wall portion 122 is provided with fitting projections 132 that protrude toward the case body 68 therebelow and are to be fitted to the fitting holes 86. The fitting projections 132 are provided at positions corresponding to the fitting holes 86 of the upper case 72, and four fitting projections 132 are provided in the present embodiment. Specifically, three fitting projections 132 are provided on the lower protection wall portion 122 covering the first accommodating region 128*a*, and one fitting projection 132 is provided on the lower protection wall portion 122 covering the second accommodating region 128*b*. The fitting projections 132 have a width dimension in the front-rear direction that is smaller than a width dimension b of the fitting holes 86 in the front-rear direction, and the fitting projections 132 are displaceable in the front-rear direction in the fitting holes 86. In short, the cover part 70 is displaceable in the front-rear direction relative to the case body 68 (upper case 72) to which the cover part 70 is attached, by the amount corresponding to the amount by which the fitting projections 132 are displaceable in the fitting holes 86.

A locking pawl 134 is provided at a protruding end portion (lower end portion) of each of the fitting projections 132. The locking pawls 134 protrude inward, or in other words, toward the placement portion 66 side relative to the fitting holes 86 into which the fitting projections 132 are inserted in the case body 68 (upper case 72) to which the cover part 70 is attached.

Note that the method for forming the cover part 70 is not limited. In the present embodiment, the cover part 70 is formed by injection molding, and punch-out holes 136 for forming the locking pawl 134 by injection molding are formed in the horizontal wall portion 106 at positions facing the locking pawls 134. In particular, in the present embodiment, the punch-out holes 136 each have a substantially rectangular shape, and, for, example, are formed to have a size that does not allow a tool or the like, such as a driver, used for bolt fastening to be inserted into the punch-out holes 136. Specifically, the punch-out holes 136 have a width dimension c (see FIG. 5) in the left-right direction that is smaller than a width dimension d (see FIG. 5) in the front-rear direction.

In the present embodiment, first bolts 138 and 138 and second bolts 140 and 140 are accommodated in the first tubular portions 114 and 114 and the second tubular portions 116 and 116, respectively, of the cover part 70 having the above-described shape. The first and second bolts 138 and 140 have substantially the same shape, and each have a shaft portion 142 having a predetermined maximum outer diameter dimension $\phi B$ (see FIG. 14), and a head portion 144 provided with an insulated portion 146. The head portions 144 including the insulated portions 146 have a maximum outer diameter dimension $\phi C$ that is larger than the inner diameter dimension $\phi A'$ of the outer opening portions 120 of the first and second tubular portions 114 and 116. As a result of peripheral edges of the head portions 144 including the insulated portions 146 abut against the retaining projections

118 of the first and second tubular portions 114 and 116, the first and second bolts 138 and 140 are prevented from being detached from the first and second tubular portions 114 and 116. Note that the method for providing the insulated portions 146 on the head portions 144 of the first and second bolts 138 and 140 is not limited. For example, a cap made of synthetic resin may be fixed to the head portion 144 of each of the first and second bolts 138 and 140 through fastening or the like, or such a cap and bolt may be integrally formed.

Connection Bus Bar 30

Figure 14:
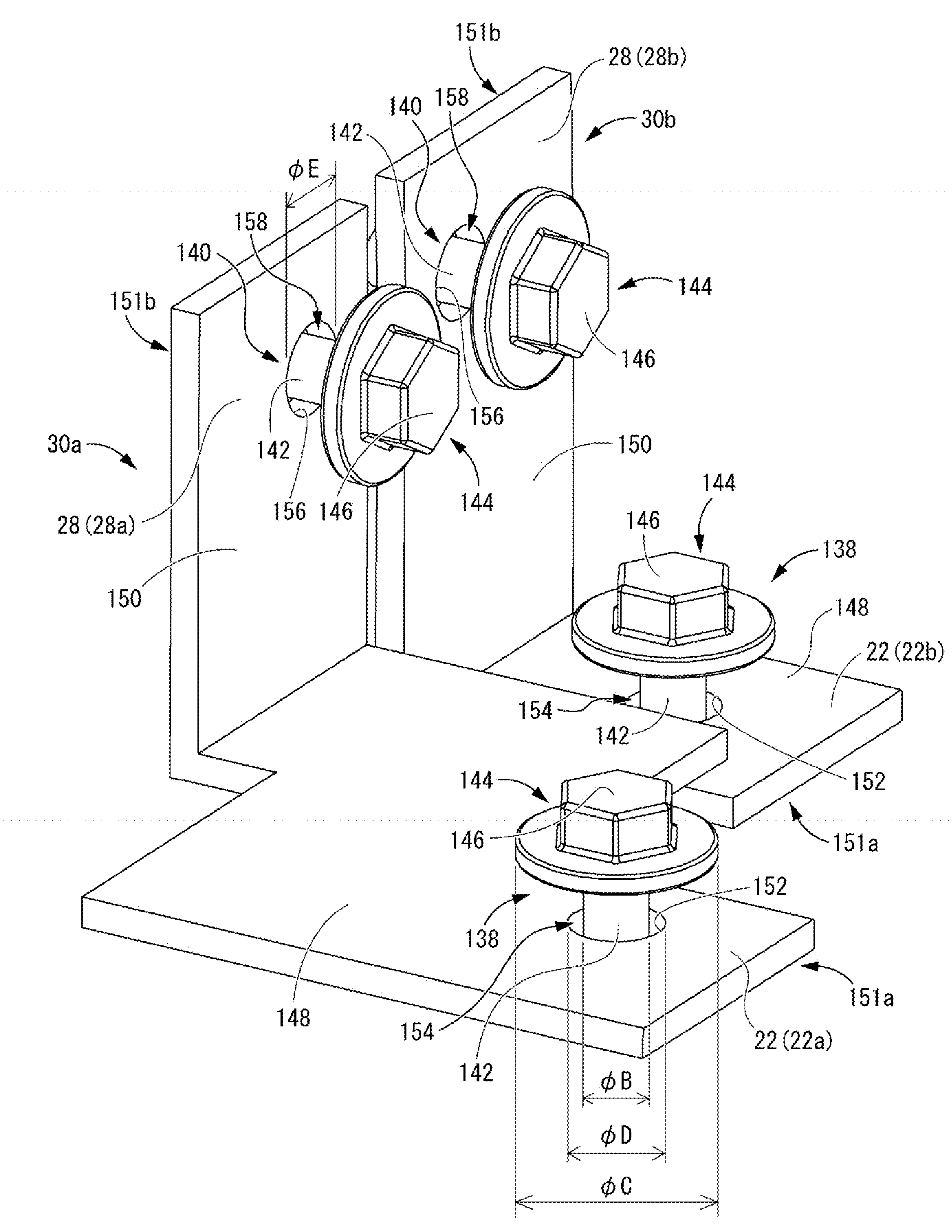
FIG. 14 is an explanatory view illustrating the relationships between first and second bolt insertion holes of the connection bus bars and first and second bolts that are passed through the first and second bolt insertion holes.

In the present embodiment, two bus bars are adopted as the connection bus bars 30 to be accommodated in the case 18, with the left bus bar constituting the first connection bus bar 30*a*, and the right bus bar constituting the second connection bus bar 30*b*. As also shown in FIG. 14, each of the first and second connection bus bars 30*a* and 30*b* includes, at a lower end portion thereof, a horizontal portion 148 extending in the horizontal direction, and also includes, at a rear end portion thereof in the horizontal direction, a vertical portion 150 protruding upward and extending in the up-down direction. That is, each of the first and second connection bus bars 30*a* and 30*b* is substantially L-shaped as a whole.

Also, the first internal connection portion 22*a* to be conductively connected to the first circuit-side connection portion 20*a* is provided at a front end portion 151*a* (end portion of the horizontal portion 148 on a side opposite to a side connected to the vertical portion 150) serving as a first end portion of the first connection bus bar 30*a*. A first external connection portion 28*a* connected to the first connector-side connection portion 26*a* is provided at an upper end portion 151*b* (end portion of the vertical portion 150 on a side opposite to a side connected to the horizontal portion 148) serving as a second end portion of the first connection bus bar 30*a*. Similarly, the second internal connection portion 22*b* to be conductively connected to the second circuit-side connection portion 20*b* is provided at a front end portion 151*a* serving as a first end portion of the second connection bus bar 30*b*. The second external connection portion 28*b* connected to the second connector-side connection portion 26*b* is provided at an upper end portion 151*b* serving as a second end portion of the second connection bus bar 30*b*. That is, in each of the connection bus bars 30*a* and 30*b*, the front end portion 151*a* serving as the first end portion extends in the front-rear direction (direction extending from the rear side toward the front side), and the upper end portion 151*b* serving as the second end portion extends in the up-down direction (direction from the lower side toward the upper side).

In the first and second connection bus bars 30*a* and 30*b*, the internal connection portions 22*a* and 22*b* each have a first bolt insertion hole 152 passing therethrough in the plate thickness direction (up-down direction). In the present embodiment, the first bolt insertion hole 152 has a substantially perfect circular shape and has a predetermined inner diameter dimension ϕD (see FIG. 14). The inner diameter dimension ϕD of the first bolt insertion hole 152 is larger than the maximum outer diameter dimension ϕB of the shaft portion 142 of the first bolt 138, and the space between the first bolt insertion hole 152 and the shaft portion 142 of the first bolt 138 serves as a tolerance absorbing gap 154 in which a tolerance can be absorbed when the first bolt 138 is passed through the first bolt insertion hole 152. That is, the first bolt insertion hole 152 is sized to include the tolerance absorbing gap 154. Since the first bolt insertion hole 152 has a substantially perfect circular shape, the tolerance absorbing gap 154 has a circular ring shape extending fully circumferentially, and the horizontal direction including the front-rear direction and the left-right direction is a tolerance absorbing direction in which a tolerance can be absorbed in the first bolt insertion hole 152.

In the first and second connection bus bars 30*a* and 30*b*, the external connection portions 28*a* and 28*b* each have a second bolt insertion hole 156 extending therethrough in the plate thickness direction (front-rear direction). In the present embodiment, the second bolt insertion hole 156 has a substantially perfect circular shape and has a predetermined inner diameter dimension ϕE (see FIG. 14). The inner diameter dimension ϕE of the second bolt insertion hole 156 is larger than the maximum outer diameter dimension ϕB of the shaft portion 142 of the second bolt 140, and the space between the second bolt insertion hole 156 and the shaft portion 142 of the second bolt 140 serves as a tolerance absorbing gap 158 in which a tolerance can be absorbed when the second bolt 140 is passed through the second bolt insertion hole 156. That is, the second bolt insertion hole 156 is sized to include the tolerance absorbing gap 158. Since the second bolt insertion hole 156 has a substantially perfect circular shape, the tolerance absorbing gap 158 has a circular ring shape extending fully circumferentially, and a direction orthogonal to the front-rear direction, including the up-down direction and the left-right direction, is a tolerance absorbing direction in which a tolerance can be absorbed in the second bolt insertion hole 156.

Assembling Step of In-Vehicle-Component Circuit Unit 10

Next, a specific example of an assembling step of the in-vehicle-component circuit unit 10 will be described. Note that the assembling step of the in-vehicle-component circuit unit 10 is not limited to the following description.

First, bolts 160 are fastened to the connection portions 60 of the first and second relays 58*a* and 58*b* to fix the first to fourth conduction bus bars 62*a* to 62*d*. The first and second relays 58*a* and 58*b* to which the first to fourth conduction bus bars 62*a* to 62*d* have been fixed are fixed to the upper wall 76 of the upper case 72 using bolts. Thereafter, the upper case 72 and the lower case 74 are attached to each other, and then fixed to each other using a locking mechanism or the like (not shown). This causes first to fourth heat dissipation portions 64*a* to 64*d* of the first to fourth conduction bus bars 62*a* to 62*d* to come into contact with the heat transfer surface 104 of the lower wall 88 via the heat transfer sheets 100. Note that the heat transfer sheets 100 may be secured in advance to the lower surfaces of the first to fourth heat dissipation portions 64*a* to 64*d*, or be secured to the upper surface (heat transfer surface 104) of the lower wall 88. This results in completion of the case body 68 with the circuit constituent member 16 accommodated therein.

In the completed state of the case body 68, the first and second bus bar fixing portions 96*a* and 96*b* of the lower case 74 abut from below against the first and second circuit-side connection portions 20*a* and 20*b* of the second and third conduction bus bars 62*b* and 62*c*. In addition, the first and second circuit-side connection portions 20*a* and 20*b* are exposed to the exterior through the first and second through windows 84*a* and 84*b* of the upper case 72.

Thereafter, the first and second connection bus bars 30*a* and 30*b* are placed on the placement portion 66 of the upper case 72. Thus, the first and second internal connection portions 22*a* and 22*b* of the first and second connection bus bars 30*a* and 30*b* are overlaid with the first and second circuit-side connection portions 20*a* and 20*b* that are exposed to the exterior. As a result, the bolt insertion holes constituting the first and second circuit-side connection portions 20*a* and 20*b* and the first bolt insertion holes 152 provided in the first and second internal connection portions 22*a* and 22*b* are in communication with each other. Then, the first and second bolts 138 and 140 are inserted into the first and second bolt insertion holes 152 and 156, respectively, of the first and second connection bus bars 30*a* and 30*b*. Note that, at this time, the first bolts 138 are not fastened to the nuts 98 located below the first and second circuit-side connection portions 20*a* and 20*b*.

Figure 10:
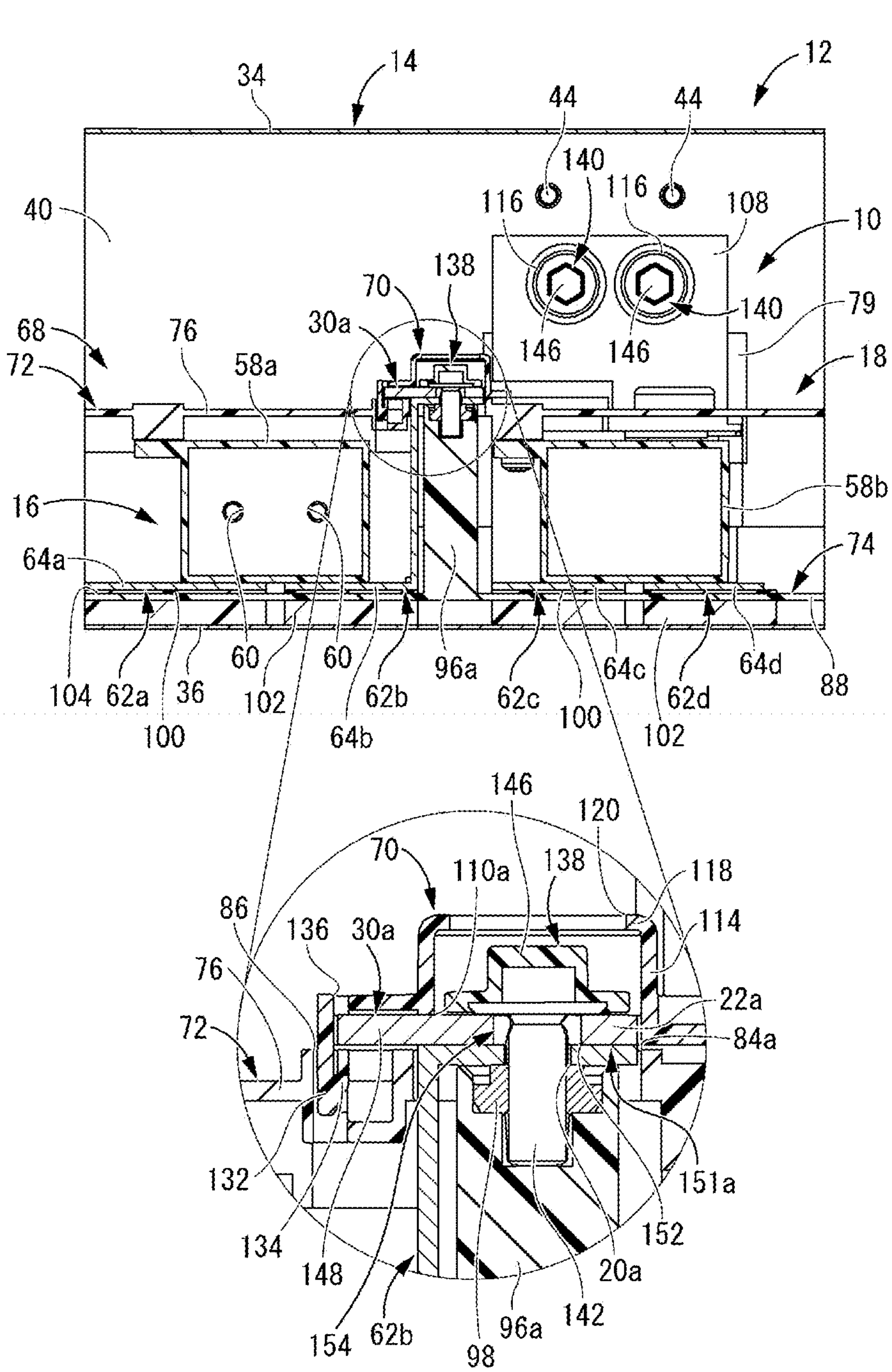
FIG. 10 is a cross-sectional view taken along the line X-X in FIG. 5.

Subsequently, with the first and second bolts 138 and 140 inserted into the first and second bolt insertion holes 152 and 156, the cover part 70 is attached to the upper case 72. Specifically, the fitting projections 132 of the cover part 70 are inserted into the fitting holes 86 of the upper case 72, and the locking pawls 134 are locked to edges of the fitting holes 86 of the upper wall 76 of the upper case 72 that are located on the placement portion 66 side, as shown in FIG. 10. Thus, the cover part 70 is attached to the case body 68 while accommodating the first and second connection bus bars 30*a* and 30*b* in the first and second accommodating region 128*a* and 128*b* of the cover part 70, and accommodating the first and second bolts 138 and 140 in the first and second tubular portions 114 and 116. This results in completion of the in-vehicle-component circuit unit 10, to which the present disclosure is directed. Note that the external circuit (not shown) will be electrically connected to the first and fourth conduction bus bars 62*a* and 62*d* of the in-vehicle-component circuit unit 10 at an appropriate timing.

Figure 15:
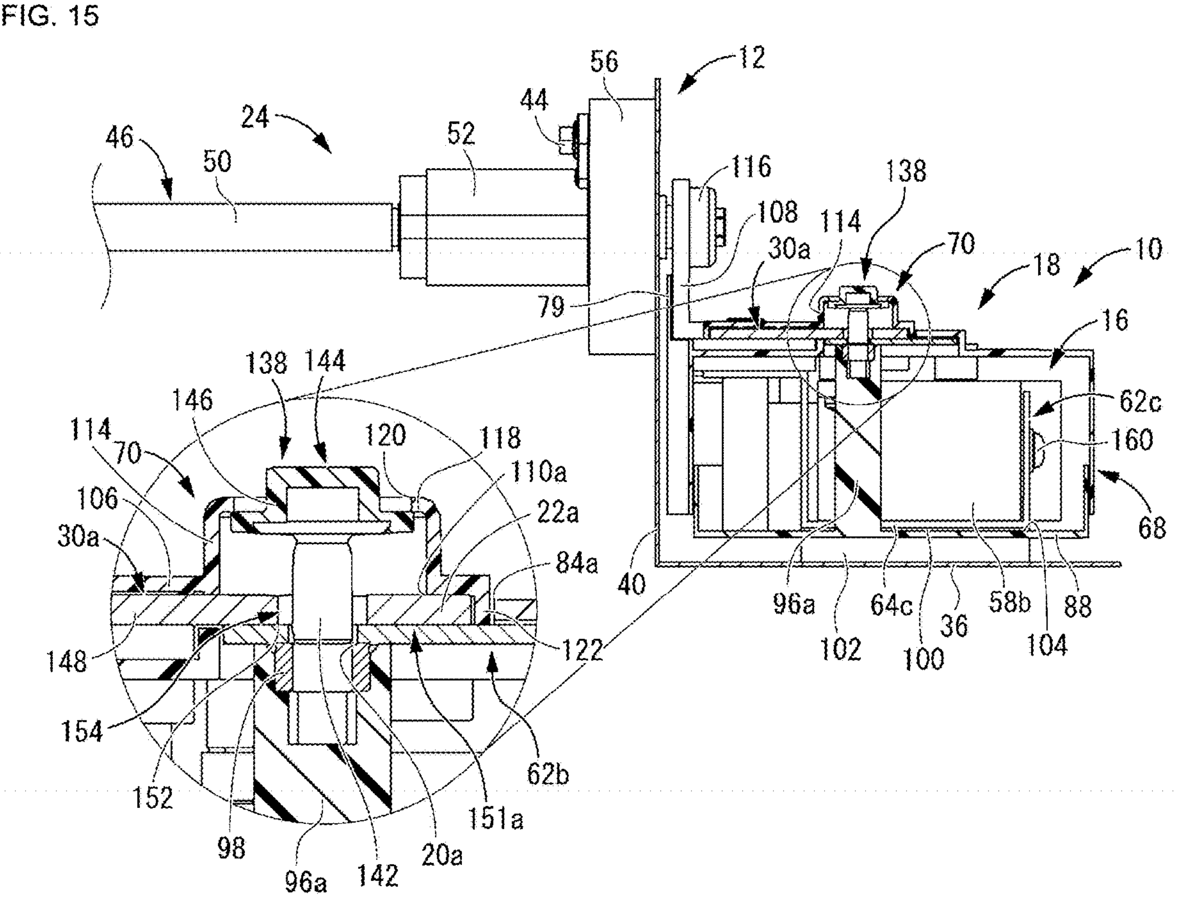
FIG. 15 is a vertical cross-sectional view showing a state in which the in-vehicle-component circuit unit shown in FIG. 1 is housed in the casing of the in-vehicle component, with the bolts in a non-fastened state, and the drawing corresponds to FIG. 8.

In the assembled state of the in-vehicle-component circuit unit 10 (state in which the in-vehicle-component circuit unit 10 is not housed in the casing 14 of the in-vehicle component (battery pack 12)), the first and second bolts 138 and 140 are not fastened anywhere, and are disposed relatively freely (in a floating state) in the first and second tubular portions 114 and 116. In this state, as shown in FIG. 15, lower end portions of the first bolts 138 are in contact with the nuts 98, and the insulated portions 146 provided on the head portions 144 of the first bolts 138 protrude outward from the outer opening portions 120 of the first tubular portions 114. In a later-described fastened state of the first bolts 138, the insulated portions 146 provided on the head portions 144 of the first bolts 138 are accommodated in the first tubular portions 114. In this state, the second bolts 140 are relatively free in the second tubular portions 116. Accordingly, the insulated portions 146 provided on the head portions 144 of the second bolts 140 may protrude outward from the outer opening portions 120 of the second tubular portions 116, or may be accommodated in the second tubular portions 116.

Next, a specific example of a step of housing the in-vehicle-component circuit unit 10 in the casing 14 of the in-vehicle component (battery pack 12) will be described. Note that the step of housing the in-vehicle-component circuit unit 10 in the casing 14 of the in-vehicle component (battery pack 12) is not limited to the following description.

Figure 16:
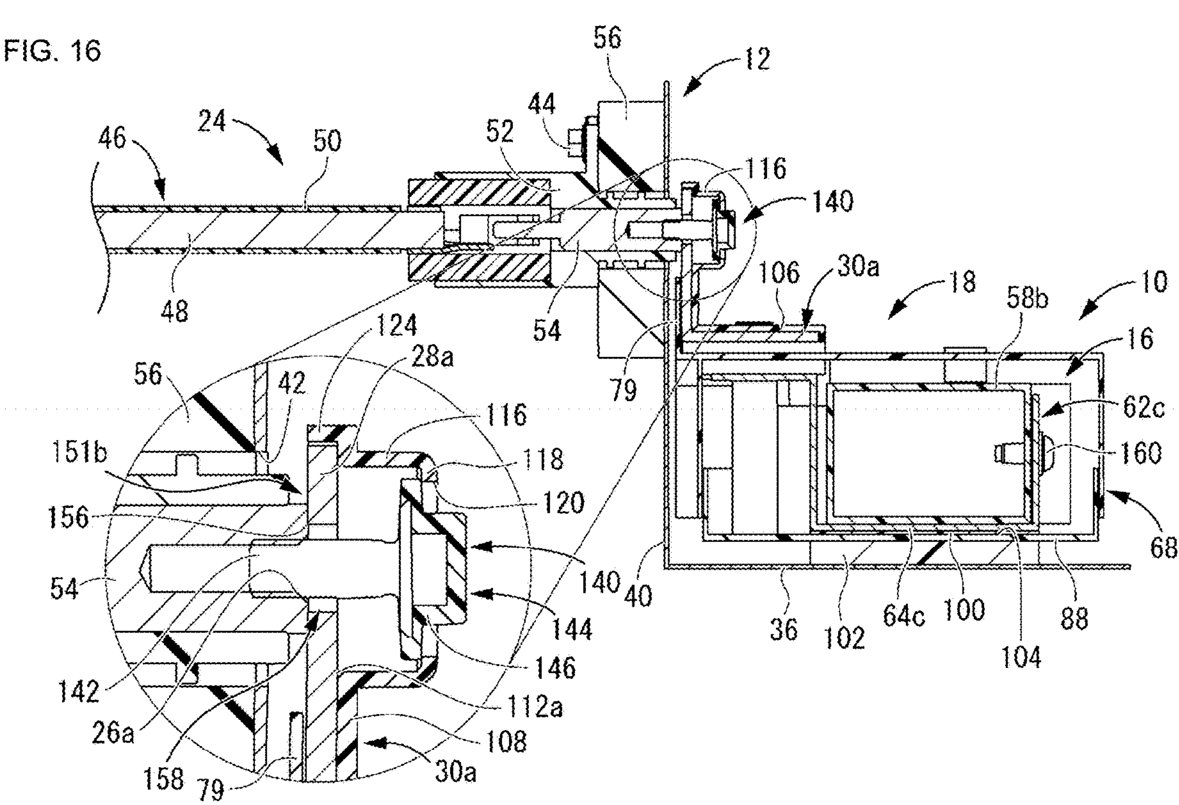
FIG. 16 is a vertical cross-sectional view showing a state in which the in-vehicle-component circuit unit shown in FIG. 1 is housed in the casing of the in-vehicle component, with the bolts in a non-fastened state, and the drawing corresponds to FIG. 9.

First, the in-vehicle-component circuit unit 10 is placed in the casing body 32 with the connector 24 attached to the rear wall portion 40. Thus, the lower surface of the case body 68 is in contact with the bottom wall 36 of the casing 14 via the gap fillers 102. In addition, the second bolts 140 inserted into the second bolt insertion holes 156 are aligned with the connector-side connection portions 26*a* and 26*b* of the connector 24. In this state, as shown in FIG. 16, the second bolts 140 are not fastened to the connector-side connection portions 26*a* and 26*b*. Also, the distal ends (rear ends) of the second bolts 140 are in contact with the openings of the connector-side connection portions 26*a* and 26*b*, and the insulated portions 146 provided on the head portions 144 of the second bolts 140 protrude outward from the outer opening portions 120 of the second tubular portions 116. In a later-described fastened state of the second bolts 140, the insulated portions 146 provided on the head portions 144 of the second bolts 140 are accommodated in the second tubular portions 116.

From this state, a tool or the like is inserted through the outer opening portion 120 of each of the second tubular portions 116, and the second bolts 140 are fastened to the connector-side connection portions 26*a* and 26*b* using the tool. Thus, the connector 24 and the connection bus bars 30*a* and 30*b* are electrically connected to each other via the second bolts 140. Thereafter, a tool or the like is inserted through the outer opening portion 120 of each of the first tubular portions 114, and the first bolts 138 are fastened to the nuts 98 through the first bolt insertion holes 152 and the circuit-side connection portions 20*a* and 20*b* using the tool. Thus, the second and third conduction bus bars 62*b* and 62*c* electrically connected to the relays 58*a* and 58*b* are electrically connected to the connection bus bars 30*a* and 30*b* via the first bolts 138. As a result, the external circuit is electrically connected to the connector 24 via the circuit constituent member 16 (first to fourth conduction bus bars 62*a* to 62*d*, first and second relays 58*a* and 58*b*), and the first and second connection bus bars 30*a* and 30*b*. After fastening the first and second bolts 138 and 140, the lid member 34 is fixed against the upper opening of the casing body 32, thus completing housing of the in-vehicle-component circuit unit 10 into the casing 14 of the in-vehicle component (battery pack 12).

Note that the in-vehicle-component circuit unit 10 can be removed from the casing 14 of the battery pack 12 by reversing the order of the above-described steps. That is, after the fastening between the first bolts 138 and the nuts 98 has been released, the fastening between the second bolts 140 and the connector-side connection portions 26*a* and 26*b* is released. Thus, the in-vehicle-component circuit unit 10 can be removed from the casing 14 of the battery pack 12. Note that the connection between the external circuit (not shown) and the first and fourth conduction bus bars 62*a* and 62*d* is cancelled at an appropriate timing.

With the in-vehicle-component circuit unit 10 housed in the casing 14 of the in-vehicle component (battery pack 12) in this manner, the internal connection portions 22*a* and 22*b* of the connection bus bars 30*a* and 30*b* provided in the case 18 are fastened to the circuit-side connection portions 20*a* and 20*b* using the first bolts 138. Here, the connection bus bars 30*a* and 30*b* are displaceable together with the cover part 70 relative to the case body 68 in the front-rear direction (see FIG. 5), while being accommodated in the accommodating regions 128*a* and 128*b* of the cover part 70, and the inner diameter dimension ϕD of the first bolt insertion holes 152 in the front-rear direction is also larger than the maximum outer diameter dimension ϕB of the shaft portions 142 of the first bolts 138. Thus, when tolerances cause the positions of the first bolt insertions hole 152 and the positions of the circuit-side connection portions 20*a* and 20*b* to be displaced from each other in the front-rear direction during fastening of the first bolts 138, the tolerances can be absorbed, thus allowing the first bolts 138 to be fastened more reliably.

Similarly, the connection bus bars 30*a* and 30*b* are displaceable in the left-right direction (see FIG. 5) in the accommodating regions 128*a* and 128*b* of the cover part 70, and the inner diameter dimension ϕD, in the left right direction, of the first bolt insertion holes 152 through which the first bolts 138 are passed through the internal connection portions 22*a* and 22*b* is also larger than the maximum outer diameter dimension ϕB of the shaft portions 142 of the first bolts 138. Thus, when tolerances cause the positions of the first bolt insertion holes 152 and the positions of the circuit-side connection portions 20*a* and 20*b* to be displaced from each other in the left-right direction during fastening of the first bolts 138, the tolerances can be absorbed, thus allowing the first bolts 138 to be fastened more reliably.

Furthermore, the external connection portions 28*a* and 28*b* of the connection bus bars 30*a* and 30*b* provided in the case 18 are fastened to the connector-side connection portions 26*a* and 26*b* using the second bolts 140. Here, the inner diameter dimension ϕE of the second bolt insertion holes 156 is larger than the maximum outer diameter dimension ϕB of the shaft portions 142 of the second bolts 140 in the up-down direction. Thus, when tolerances cause the positions of the second bolt insertion holes 156 and the positions of the connector-side connection portions 26*a* and 26*b* to be displaced from each other in the up-down direction, the tolerances can be absorbed, for example, by adjusting the elastic deformation amount (compression amount) in the heat transfer sheets 100 and the gap fillers 102, thus allowing the second bolts 140 to be fastened more reliably.

Furthermore, the inner diameter dimension ϕE, in the left right direction, of the second bolt insertions hole 156 through which the second bolts 140 are passed through the external connection portions 28*a* and 28*b* of the connection bus bars 30*a* and 30*b* is also larger than the maximum outer diameter dimension ϕB of the shaft portions 142 of the second bolts 140. Thus, even when tolerances cause the positions between the second bolt insertion holes 156 and the connector-side connection portions 26*a* and 26*b* to be displaced in the left-right direction during fastening of the second bolts 140, the tolerance can be absorbed, thus allowing the second bolts 140 to be fastened more reliably.

The connection bus bars 30*a* and 30*b* are provided in the case 18, and portions of the connection bus bars 30*a* and 30*b* other than the first window portions 110*a* and 110*b* and the second window portions 112*a* and 112*b* are covered by the case 18 (cover part 70). This can reduce the possibility that a worker may receive an electric shock by accidentally coming into contact with a current-carrying portion during a bolt fastening operation or the like.

In particular, although the process of the bolt fastening operation is not limited, in the present embodiment, first, the external connection portions 28*a* and 28*b* and the connector-side connection portions 26*a* and 26*b* are fastened to each other using the second bolts 140, and thereafter the internal connection portions 22*a* and 22*b* and the circuit-side connection portions 20*a* and 20*b* are fastened to each other using the first bolts 138. Thus, during fastening of the second bolts 140, the fastening portions on the first bolt 138 side to which power is supplied are in a non-fastened state, and therefore the fastening portions on the second bolt 140 side will not be current-carrying portions, thus enabling a safer bolt fastening operation.

The left and right first window portions 110*a* and 110*b* and the left and right second window portions 112*a* and 112*b* are surrounded by the first and second tubular portions 114 and 116 each protruding outward of the case 18. This can further reduce the possibility of causing an electric shock due to contact with the bolt-fastened portions, which may become current-carrying portions, through the first window portions 110*a* and 110*b* and the second window portions 112*a* and 112*b* when fastening the first and second bolts 138 and 140.

The first and second bolts 138 and 140 are accommodated inside the left and right first window portions 110*a* and 110*b* and the left and right second window portions 112*a* and 112*b*, and the first and second bolts 138 and 140 are prevented from being detached from the first and second tubular portions 114 and 116 by the retaining projections 118. This obviates the need to separately provide and fasten the first bolts and the second bolts, thus enhancing the bolt fastening workability. In particular, the provision of the retaining projections 118 can reduce the opening dimension of the outer opening portions 120 of the first and second tubular portions 114 and 116, and it is thus possible to further reduce the possibility of causing an electric shock during bolt fastening.

Since the insulated portions 146 are provided on the head portions 144, the first and second bolts 138 and 140 can reduce the possibility of giving an electric shock to a worker through a tool or the like during bolt fastening. In particular, the insulated portions 146 of the first and second bolts 138 and 140 protrude outward from the outer opening portions 120 when the bolts are not fastened, and are accommodated inside the outer opening portions 120 when the bolts are fastened. Accordingly, whether the first and second bolts 138 and 140 are in the fastened state or the non-fastened state can be visually determined from the exterior. In addition, only the insulated portions 146 of the first and second bolts 138 and 140 protrude outward when the bolts are not fastened. Accordingly, it is possible to reduce the possibility of causing an electric shock due to accidental contact.

The case 18 includes the case body 68 in which the connection bus bars 30*a* and 30*b* are placed, and the cover part 70 covering the connection bus bars 30*a* and 30*b* and attached to the case body 68. Also, the cover part 70 and the connection bus bars 30*a* and 30*b* are displaceable together relative to the case body 68 in the front-rear direction. Thus, the connection bus bars 30*a* and 30*b* will not be exposed from the cover part 70 (case 18), for example, when displaced in the front-rear direction, so that it is possible to further reduce the possibility that a worker may receive an electric shock by accidentally coming into contact with the connection bus bars 30*a* and 30*b*. Also, the cover part 70 is provided with the first window portions 110*a* and 110*b* and the second window portions 112*a* and 112*b*, and the cover part 70 and the connection bus bars 30*a* and 30*b* are displaced together. Accordingly, the first window portions and the second window portions need not be formed large to accommodate displacement of the connection bus bars, and the opening dimensions of the first window portions 110*a* and 110*b* and the second window portions 112*a* and 112*b* can be set small, so that it is possible to further reduce the possibility of causing an electric shock.

The case body 68 includes the fitting holes 86 extending in the front-rear direction, the cover part 70 includes the fitting projections 132 configured to be fitted to the fitting holes 86, and the fitting projections 132 are displaceable in the front-rear direction in the fitting hole 86. Accordingly, it is possible to displace the cover part 70 relative to the case body 68 in the front-rear direction, while maintaining the assembled state of the case body 68 and the cover part 70.

In particular, the fitting projections 132 have the locking pawls 134, and the locking pawls 134 protrude inward toward the placement portion 66 side relative to the fitting holes 86. The locking pawls 134 are configured to be engaged with edge portions of the fitting holes 86 of the upper case 72 that are located on the placement portion 66 side when the cover part 70 has been attached to the case body 68. Thus, the engaging portions between the locking pawls 134 and the case body 68 (fitting holes 86) cannot be viewed from the exterior. Even if a tool such as a driver is inserted into a fitting hole 86, it will be difficult to bend the corresponding fitting projection 132 in a direction in which the locking pawl 134 and the fitting hole 86 are disengaged from each other. Accordingly, the mounted state of the case body 68 and the cover part 70 can be stably maintained, thus preventing, for example, an electric shock caused by accidental contact with the connection bus bars 30*a* and 30*b*.

The cover part 70 includes the ribs 130 on the surface thereof with which the connection bus bars 30*a* and 30*b* are overlaid, and the ribs 130 restrict upward displacement of the connection bus bars 30*a* and 30*b*, and hence upward displacement of the circuit constituent member 16 including the second and third conduction bus bars 62*b* and 62*c*. This allows the heat dissipation portions 64*a* to 64*d* to more reliably come into contact with the heat transfer surface 104 of the lower wall 88 of the lower case 74 via the heat transfer sheets 100, thus enhancing the heat dissipation efficiency through the casing 14 of the battery pack 12. In particular, in the present embodiment, heat generated in the connection portions (portions to which the second bolts 140 are fastened) between the connector 24 and the in-vehicle-component circuit unit 10 can be dissipated through the casing 14 of the battery pack 12, for example, via the connection bus bars 30*a* and 30*b* and the second and third conduction bus bars 62*b* and 62*c* (second and third heat dissipation portions 64*b* and 64*c*).

The connection bus bars 30*a* and 30*b* include the front end portions 151*a* serving as the first end portions extending in the front-rear direction, and the upper end portions 151*b* serving as the second end portions extending in the up-down direction. The first bolt insertion holes 152 are provided in the front end portions 151*a*, and the second bolt insertion holes 156 are provided in the upper end portions 151*b*. Also, the inner diameter dimension ϕD of the first bolt insertion holes 152 is larger than the outer diameter dimension ϕB of the shaft portions 142 of the first bolts 138 in the horizontal direction including the front-rear direction and the left-right direction, and the first bolt insertion holes 152 each includes a tolerance absorbing gap 154. The inner diameter dimension ϕE of the second bolt insertion holes 156 is larger than the outer diameter dimension ϕB of the shaft portions 142 of the second bolts 140 in a direction orthogonal to the front-rear direction, including the up-down direction and the left-right direction, and the second bolt insertion holes 156 each include a tolerance absorbing gap 158. Accordingly, the tolerance absorbing direction in the first bolt insertion holes 152 and the tolerance absorbing direction in the second bolt insertion holes 156 can be different from each other, so that it is possible to absorb tolerances in a plurality of directions.

Other Embodiments

The technique described in the present specification is not limited to the embodiments described and illustrated above. For example, the following embodiments also fall within the technical scope of the technique described in the present specification.

Figure 17:
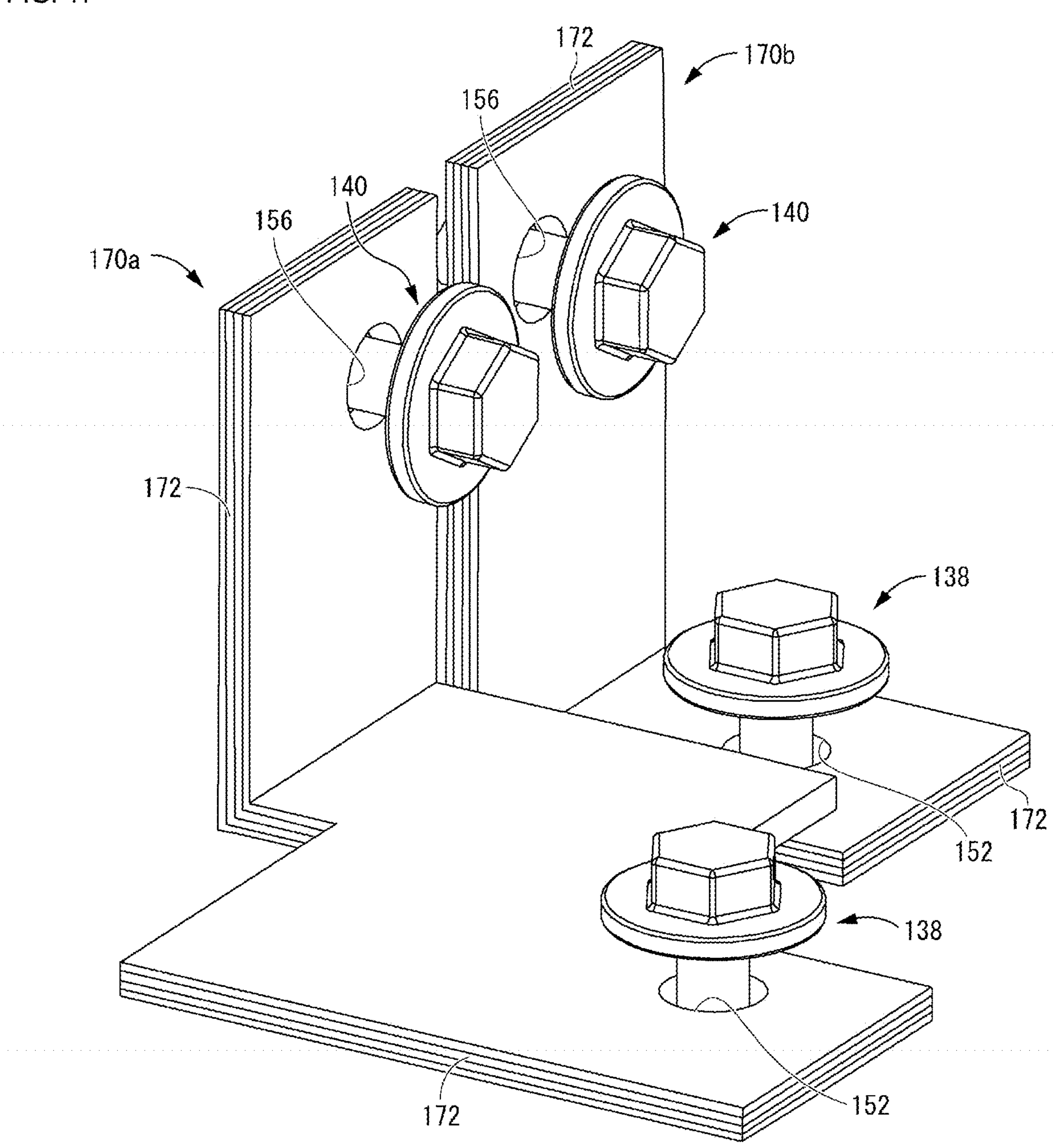
FIG. 17 is a perspective view showing connection bus bars constituting a part of an in-vehicle-component circuit unit according to another embodiment of the present disclosure.

In the above embodiment, each of the connection bus bars 30*a* and 30*b* is formed by bending a single metal flat plate. However, as shown in FIG. 17, first and second connection bus bars 170*a* and 170*b* may each be formed as a stack of a plurality of thin plates 172. This allows the connection bus bars 170*a* and 170*b* to be flexibly deformed, for example, even in the case where each of the connection bus bars has a short length and thus would have a relatively large deformation stiffness if the bus bar is formed by a single flat plate-shaped bus bar. As a result, it is possible to more efficiently absorb tolerances, thus stably connecting the circuit-side connection portions and the connector-side connection portions to the connection bus bars 170*a* and 170*b*.

In the above embodiment, the heat transfer sheets 100 and the gap fillers 102 are elastically deformable in the up-down direction to enable the in-vehicle-component circuit unit 10 to be displaced relative to the casing 14 of the battery pack 12 in the up-down direction, thus absorbing tolerances in the up-down direction. However, the present disclosure is not limited to this configuration. For example, a backlash in the up-down direction may be provided in each of the fitting portions (locking portions between the locking pawls and the upper wall of the upper case) between the fitting projections and the corresponding fitting holes, and the cover part and the connection bus bars may be fixed to each other, thus enabling the connection bus bars to be displaced together with the cover part relative to the case in the up-down direction to absorb tolerances in the up-down direction. The fitting projections may be displaceable in the fitting holes in the left-right direction to enable the connection bus bars to be displaced together with the cover part relative to the case in the left-right direction.

In the above embodiment, the left and right first window portions 110*a* and 110*b* and the left and right second window portions 112*a* and 112*b* are provided in the cover part 70. However, the cover part is not essential. That is, the connection bus bars may be displaceably accommodated in a case including an upper case and a lower case, and the first window portions and the second window portions may be formed in the upper wall of the upper case.

In the above embodiment, the insulated portion 146 is provided on each of the head portions 144 of the first and second bolts 138 and 140. However, there is no limitation on the shape of the insulated portion. For example, a hexagonal hole portion may be provided in a central protruding portion of each of the insulated portions, and a tool may be inserted into the hole portion to perform bolt fastening. Thus, the opening dimension of the outer opening portions of the first and second tubular portions can be further reduced.

The first and second bolts are not limited to a configuration in which these bolts are accommodated in the first and second tubular portions, and may be configured to be fastened, as components separate from the in-vehicle-component circuit unit according to the present disclosure, to the circuit-side connection portions and the connector-side connection portions. That is, the first tubular portions and the second tubular portions are not essential for the in-vehicle-component circuit unit according to the present disclosure.

In the above embodiment, the nuts 98 and the connector-side connection portions 26*a* and 26*b* are disposed in a reception waiting state so as to be fastened to the first and second bolts 138 and 140 accommodated in the first tubular portions 114 and the second tubular portions 116. However, for example, the first and second bolts may be disposed in a protruding state, and the nuts may be fastened thereto. The nuts may be accommodated in the first and second tubular portions as described above, or may be provided as components separate from the in-vehicle-component circuit unit according to the present disclosure.

In the above embodiment, the retaining projections 118 each have an annular shape extending continuously and fully circumferentially, but may be provided partially circumferentially.

In the above embodiment, two connection bus bars 30*a* and 30*b* are provided. However, one, or three or more connection bus bars may be provided. The number and the like of the relays and the conduction bus bars may be changed according to the number of the connection bus bars, and the type, shape, number, and the like of the members constituting the circuit constituent member are not limited.

In the above embodiment, the tolerance absorbing directions are set to the front-rear direction and the left-right direction, as well as the up-down direction. However, the tolerance absorbing directions are not limited thereto. When one tolerance absorbing direction is required, the connection bus bars may be displaceable only in one direction, which may be an oblique direction.

In the above embodiment, the first and second bolt insertion holes 152 and 156 each have a perfect circular shape, but may each have, for example, the shape of an elongated hole extending in the tolerance absorbing direction.

In the above embodiment, the ribs 130 that are provided on the inner surface of the cover part 70 suppress the first and second connection bus bars 30*a* and 30*b* from being lifted, thus also suppressing lifting of the second and third conduction bus bars 62*b* and 62*c* connected to the first and second connection bus bars 30*a* and 30*b*. However, the present disclosure is not limited to this configuration. For example, alternatively or in addition to the ribs on the cover part, ribs may be provided on the inner surface of the upper case, and the ribs on the inner surface of the upper case may suppress lifting of the conduction bus bars. As a result, the state of contact between the heat dissipation portions of the conduction bus bars and the heat transfer surface of the case body can be maintained, thus achieving a favorable heat dissipation effect.

In the above embodiment, the insulated portions 146 provided on the head portions 144 of the first and second bolts 138 and 140 protrude to the exterior from the first and second tubular portions 114 and 116 when the first and second bolts 138 and 140 are in a non-fastened state. However, the present disclosure is not limited to this configuration. That is, for example, the protruding height dimensions of the first and second tubular portions from the horizontal wall portion and the vertical wall portion of the cover part may be larger than the entire length of the first and second bolts (including the insulated portions), thus allowing the first and second bolts including the insulated portions provided on the head portions to be entirely accommodated in the first and second tubular portions even when the first and second bolts are in the non-fastened state as shown in FIGS. 15 and 16. In that case, the insulated portions need not be provided on the head portions of the first and second bolts. Even when the first and second bolts are in the non-fastened state, accommodating the first and second bolts in the first and second tubular portions makes it possible to prevent a worker from receiving an electric shock by accidentally coming into contact with first and second bolts.

The invention claimed is:

1. An in-vehicle-component circuit unit configured to be housed in a casing of an in-vehicle component, comprising:

a circuit constituent member;

an insulating case accommodating the circuit constituent member;

a connection bus bar accommodated in the case and including an internal connection portion to be conductively connected to a circuit-side connection portion provided in the circuit constituent member, and an external connection portion to be conductively connected to a connector-side connection portion of a connector provided on the casing;

a first window portion provided in the case and disposed facing the internal connection portion of the connection bus bar and a first bolt insertion hole provided in the internal connection portion; and a second window portion provided in the case and disposed facing the external connection portion of the connection bus bar and a second bolt insertion hole provided in the external connection portion, wherein the first bolt insertion hole and the second bolt insertion hole are each sized to include a tolerance absorbing gap extending in a tolerance absorbing direction, the connection bus bar is accommodated so as to be displaceable relative to the case in the tolerance absorbing direction, the first window portion is open with a size that enables a bolt fastening operation to be performed from an exterior of the case to the circuit-side connection portion of the internal connection portion through the first window portion, and the second window portion is open with a size that enables a bolt fastening operation to be performed from the exterior of the case to the connector-side connection portion of the external connection portion through the second window portion.

2. The in-vehicle-component circuit unit according to claim 1, wherein each of the first window portion and the second window portion is surrounded by a tubular portion protruding outward of the case.

3. The in-vehicle-component circuit unit according to claim 2, wherein a bolt or a nut is accommodated in an interior of the tubular portion of each of the first window portion and the second window portion, a retaining projection protruding radially inward is provided on a protruding distal end side of the tubular portion, and the bolt or the nut is prevented from being detached from the tubular portion by abutting against the retaining projection.

4. The in-vehicle-component circuit unit according to claim 3, wherein the bolt or the nut accommodated in each of the tubular portions includes an insulated portion, and the insulated portion of the bolt or the nut is configured to: protrude to an exterior from the tubular portion in a non-fastened state; and be accommodated in the tubular portion in a fastened state.

5. The in-vehicle-component circuit unit according to claim 1, wherein the case includes a case body including a placement portion on which the connection bus bar is placed, and a cover part covering the placement portion and attached to the case body so as to be displaceable relative to the case body in the tolerance absorbing direction, and the cover part includes the first window portion and the second window portion, and is displaced together with the connection bus bar in the tolerance absorbing direction.

6. The in-vehicle-component circuit unit according to claim 5, wherein the case body includes a fitting hole extending in the tolerance absorbing direction in an area surrounding the placement portion, and the cover part includes a fitting projection protruding from a peripheral edge portion of the cover part toward the case body so as to be fitted to the fitting hole, and the fitting projection has a smaller width dimension in the tolerance absorbing direction than the fitting hole.

7. The in-vehicle-component circuit unit according to claim 6, wherein the fitting projection includes a locking pawl provided at a protruding end portion of the fitting projection and protruding toward the placement portion side relative to the fitting hole, and the locking pawl inserted in the fitting hole is engaged with an edge portion of the fitting hole that is located on the placement portion side.

8. The in-vehicle-component circuit unit according to claim 1, wherein the internal connection portion and the external connection portion extend in directions intersecting each other, the first bolt insertion hole provided in the internal connection portion and the second bolt insertion hole provided in the external connection portion pass through in directions intersecting each other, and the tolerance absorbing direction of the first bolt insertion hole in the tolerance absorbing gap and the tolerance absorbing direction of the second bolt insertion hole in the tolerance absorbing gap are orthogonal to each other.

9. The in-vehicle-component circuit unit according to claim 5, wherein the cover part includes a rib protruding toward the placement portion, and the rib abuts against or faces the connection bus bar while the cover part is attached to the case body.

10. The in-vehicle-component circuit unit according to claim 1, wherein the connection bus bar includes a first end portion provided with the internal connection portion, and a second end portion provided with the external connection portion and protruding above the first end portion, and the internal connection portion includes the first bolt insertion hole having the tolerance absorbing gap in an extension direction of the first end portion, and the external connection portion includes the second bolt insertion hole having the tolerance absorbing gap in an extension direction of the second end portion.

11. The in-vehicle-component circuit unit according to claim 1, wherein the connection bus bar is a stack of a plurality of thin plates.

* * * * *